United States Patent
Nakamura

(10) Patent No.: US 7,191,746 B2
(45) Date of Patent: Mar. 20, 2007

(54) ENGINE START CONTROL APPARATUS

(75) Inventor: Makoto Nakamura, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/249,451

(22) Filed: Oct. 14, 2005

(65) Prior Publication Data
US 2006/0081207 A1  Apr. 20, 2006

(30) Foreign Application Priority Data
Oct. 18, 2004  (JP) ............................. 2004-302345

(51) Int. Cl.
   F02N 17/00   (2006.01)
   F02N 1/00    (2006.01)
(52) U.S. Cl. ................................ 123/179.3; 123/179.18
(58) Field of Classification Search ............. 123/179.1, 123/179.3, 179.16, 179.18, 90.18, 90.21, 123/90.31
See application file for complete search history.

(56) References Cited

U.S. PATENT DOCUMENTS

| 6,647,935 | B2 * | 11/2003 | Aoyama et al. | ......... 123/90.16 |
| 6,769,404 | B2 * | 8/2004 | Aoyama et al. | ......... 123/406.29 |
| 6,807,956 | B2 * | 10/2004 | Gaessler et al. | ....... 123/568.14 |
| 2002/0017256 | A1 * | 2/2002 | Shiraishi et al. | ......... 123/90.15 |
| 2002/0026913 | A1 * | 3/2002 | Ariga | ....................... 123/90.11 |
| 2002/0092488 | A1 * | 7/2002 | Aoyama et al. | ......... 123/90.16 |
| 2003/0019448 | A1 * | 1/2003 | Aoyama et al. | ......... 123/90.16 |
| 2003/0154964 | A1 * | 8/2003 | Gaessler et al. | ....... 123/568.14 |

FOREIGN PATENT DOCUMENTS

| JP | 2002-39038 A  | 2/2002 |
| JP | 2002-61522 A  | 2/2002 |
| JP | 2003-172112 A | 6/2003 |
| JP | 2004-11537 A  | 1/2004 |

* cited by examiner

*Primary Examiner*—John T. Kwon
(74) *Attorney, Agent, or Firm*—Foley & Lardner LLP

(57) ABSTRACT

An engine start control apparatus includes a crank angle sensor, and a stroke discrimination device that discriminates which of engine cylinders is in intake or compression strokes in an engine stopped state. A crankshaft is temporarily reverse-rotated in a reverse-rotational direction by way of crankshaft reverse-rotation control until an intake valve becomes shifted from a valve closed state to a valve open state, when cranking the engine for startup under a specific condition where a crankangle of an engine cylinder whose piston stroke is in the intake stroke or in the compression stroke, is within a specified crankangle range from 40 degrees of crankangle before a piston B.D.C. position to 40 degrees of crankangle after the piston B.D.C. position. The crankshaft is rotated in a normal-rotational direction by way of crankshaft normal-rotation control after the intake valve has been shifted to the valve open state.

18 Claims, 10 Drawing Sheets

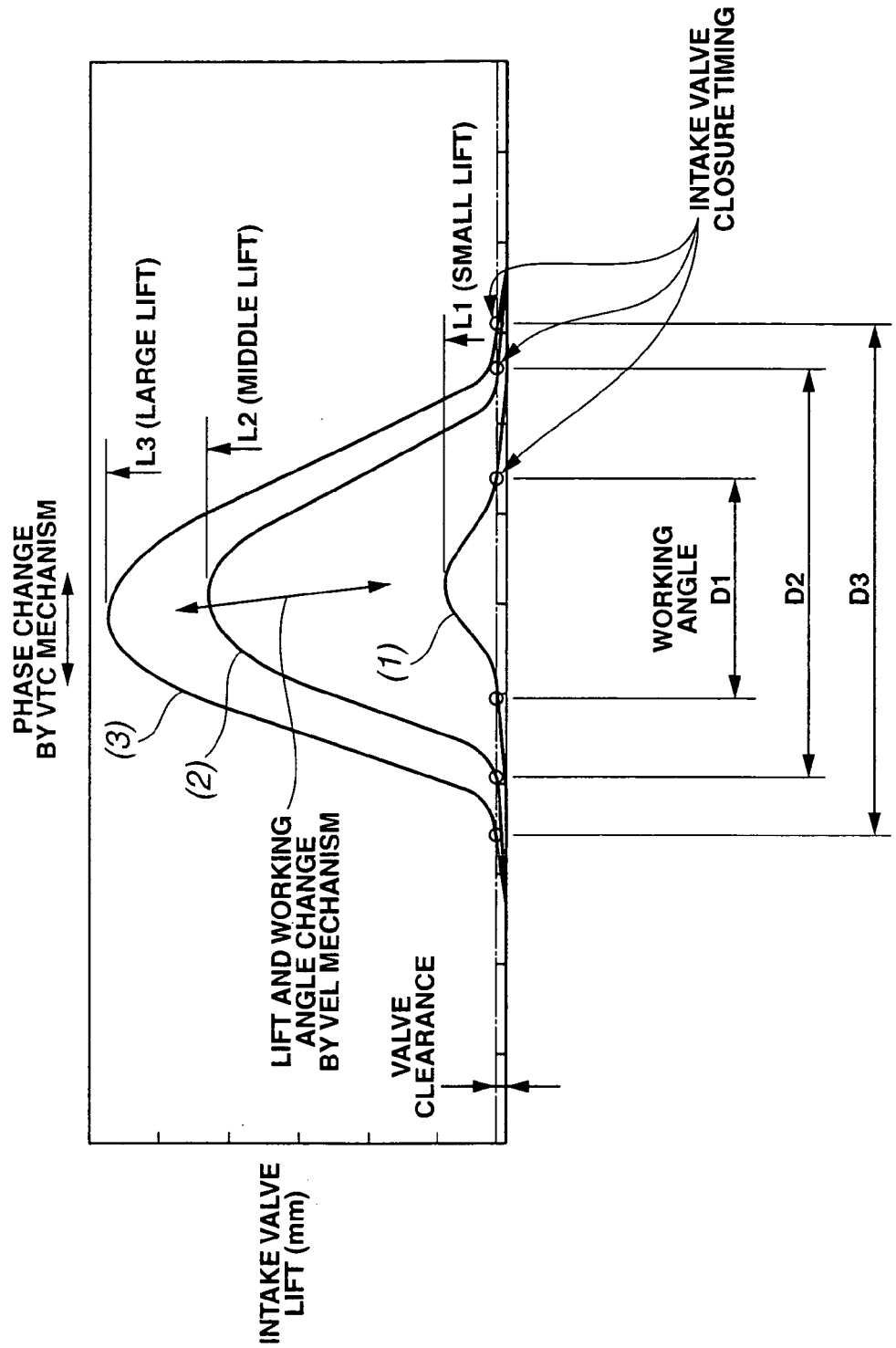

ENGINE START CONTROL APPARATUS

TECHNICAL FIELD

The present invention relates to an engine start control apparatus, and specifically to the improvement of an engine start/restart control technology by which an engine start performance of an automotive vehicle employing a multiple-cylinder internal combustion engine can be enhanced.

BACKGROUND ART

In recent years, there have been proposed and developed various engine start control technologies. One such engine start control device, having an engine self-starting function, has been disclosed in Japanese Patent Provisional Publication No. 2002-39038 (hereinafter is referred to as "JP2002-39038"). The engine start control device disclosed in JP2002-39038 includes an in-cylinder direct fuel-injection system provided to spray fuel directly into each individual engine cylinder, a crank angle sensor or a crankshaft position sensor that detects a crank angle of an engine crankshaft, an electronic ignition system that provides high-voltage surges or electric sparks that ignite the compressed air/fuel mixture in the engine cylinders, and an engine start control system that detects or discriminates an engine cylinder (hereinafter is referred to as "#1 cylinder"), whose piston stroke is an expansion stroke, after the engine has been temporarily stopped, and thereafter initiates self-restarting operation or self-start-up operation by spraying fuel into the #1 cylinder in the expansion stroke and igniting the air/fuel mixture in the #1 cylinder, without using an engine starter. In the engine start control device disclosed in JP2002-39038, in order for the self-restarting operation (or the self-start-up operation) to be executed satisfactorily, and thus to enhance the engine self-startablity, an open-and-closure timing of an intake valve of an engine cylinder (hereinafter is referred to as "#3 cylinder") in a compression stroke is controlled to open the intake valve even on the compression stroke by a variable phase control mechanism. Thus, during the self-restarting operation, it is possible to effectively reduce a compressive force (compression pressure) created by the #3 cylinder in the compression stroke, which compressive force acts to consume part of torque created by the #1 cylinder in the expansion stroke.

Another type of engine start control device has been disclosed in Japanese Patent Provisional Publication No. 2002-61522 (hereinafter is referred to as "JP2002-61522"). In the engine start control device (or the electronic engine control device) disclosed in JP2002-61522, when the engine is shifting to a stopped state, in order to reduce an in-cylinder pressure for easy engine restarting, an intake valve closure timing is, beforehand, phase-advanced to a given timing value before a bottom dead center (B.D.C.) position of a piston by means of a variable phase control mechanism.

SUMMARY OF THE INVENTION

However, in the engine start control system as disclosed in JP2002-39038, during the early stage of engine startup in which the engine has not yet been started satisfactorily, the system has difficulty in controlling the variable phase control mechanism. To avoid this, an electromagnetically-powered engine valve operating device may be used instead of the variable phase control mechanism. The use of such an electromagnetically-powered valve operating device leads to another problem, such as noise and vibrations during powered opening or closing of the electromagnetically-powered engine valve, and increased electric power consumption of a car battery. Additionally, the electromagnetically-powered engine valve is expensive. Thus, the electromagnetically-powered engine valve operating device is lacking in practicality.

On the other hand, in the engine start control device (or the electronic engine control device) disclosed in JP2002-61522, suppose that the piston-stroke position is near the B.D.C position when the engine has been stopped. In such a case, during the last stage of the stopped period, a negative pressure (less than atmospheric pressure) is temporarily created in the cylinder by the piston downstroke toward the B.D.C position with the intake valve closed due to the intake valve closure timing advanced before the B.D.C position. A space defined between the cylinder wall and the piston is not perfectly sealed. Actually, there is a slight piston-to-cylinder clearance space. Owing to entry of atmospheric pressure into the cylinder (the combustion chamber), the in-cylinder pressure gradually approaches from the temporarily-created negative pressure to the atmospheric pressure with time. Assuming that the engine is started up under the in-cylinder pressure substantially identical to atmospheric pressure, air in the cylinder, being in the atmospheric-pressure state, has to be compressed by the upstroke of the piston from the piston-stroke position near the B.D.C position, with the intake and exhaust valves closed. As can be seen from the crankangle versus in-cylinder pressure characteristic curve indicated by the broken line in FIG. 7, there is an increased tendency for the in-cylinder pressure to become an excessively high pressure level (approximately, 10 atmosphere) at a top dead center (T.D.C.) position of the piston on compression stroke. Such an excessively high in-cylinder pressure results in undesirable noise and vibrations during operation of the engine.

In particular, on hybrid vehicles employing an automatic engine stop-restart system capable of temporarily automatically stopping an internal combustion engine under a specified condition where a selector lever of an automatic transmission is kept in its neutral position, the vehicle speed is zero, the engine speed is an idle speed, and the brake pedal is depressed, and automatically restarting the engine from the vehicle standstill state, the vehicle occupants may experience uncomfortable noise and vibrations during operation of the automatic engine stop-restart system, in particular, during engine startup under the in-cylinder pressure substantially identical to atmospheric pressure.

Accordingly, it is an object of the invention to provide an engine start control apparatus capable of suppressing noise and vibrations during cranking for engine startup by preventing an excessive in-cylinder pressure rise, while reducing electrical load on a car battery or on a starter motor, eliminating complicated control procedures, and realizing a high practicality.

In order to accomplish the aforementioned and other objects of the present invention, an engine start control apparatus comprises a crank angle sensor adapted to detect a crankangle of a crankshaft of an engine, a stroke discrimination device that discriminates which of engine cylinders is in either one of intake and compression strokes or in either one of expansion and exhaust strokes, and a controller configured to be electronically connected to at least the crank angle sensor and the stroke discrimination device for controlling rotary motion of the crankshaft during an engine start-up period, the controller comprising a processor programmed to perform the following, setting a closure timing of an intake valve to a preset timing value before a piston bottom dead center (B.D.C.) position as preparation for engine startup, temporarily rotating the crankshaft in a reverse-rotational direction by way of crankshaft reverse-rotation control until the intake valve becomes shifted from a valve closed state to a valve open state, when cranking the engine for startup under a specific condition where a crankangle of an engine cylinder whose piston stroke is in the intake stroke or in the compression stroke, is within a crankangle range substantially corresponding to the piston B.D.C. position, and rotating the crankshaft in a normal-rotational direction by way of crankshaft normal-rotation control after the intake valve has been shifted to the valve open state.

According to another aspect of the invention, an engine start control apparatus comprises a piston-stroke position detection section that detects piston-stroke positions of reciprocating pistons of an engine, and a controller configured to be electronically connected to at least the piston-stroke position detection section for controlling rotary motion of a crankshaft during an engine start-up period; the controller comprising a processor programmed to perform the following, discriminating, based on the detected piston-stroke positions, which of engine cylinders is in either one of intake and compression strokes or in either one of expansion and exhaust strokes, rotating the crankshaft in a reverse-rotational direction by way of crankshaft reverse-rotation control until an intake valve becomes shifted from a valve closed state to a valve open state, when restarting the engine under a specific condition where the piston-stroke position of an engine cylinder whose piston stroke is in the intake stroke or in the compression stroke, is within a crankangle range substantially corresponding to a piston bottom dead center position, and rotating the crankshaft in a normal-rotational direction by way of crankshaft normal-rotation control after the intake valve has been shifted to the valve open state.

According to a further aspect of the invention, an engine start control apparatus comprises an in-cylinder pressure sensor that detects an in-cylinder pressure, a stroke discrimination device that discriminates which of engine cylinders is in either one of intake and compression strokes or in either one of expansion and exhaust strokes, and a controller configured to be electronically connected to at least the in-cylinder pressure sensor and the stroke discrimination device for controlling rotary motion of a crankshaft during an engine start-up period, the controller comprising a processor programmed to perform the following, rotating the crankshaft in a reverse-rotational direction by way of crankshaft reverse-rotation control until an intake valve becomes shifted from a valve closed state to a valve open state, when cranking the engine for startup under a specific condition where the in-cylinder pressure, created in an engine cylinder when a predetermined time duration has expired from a time when the engine has been stopped, reaches a predetermined negative pressure value, and a piston-stroke position of the engine cylinder is in the intake stroke or in the compression stroke, and rotating the crankshaft in a normal-rotational direction by way of crankshaft normal-rotation control after the intake valve has been shifted to the valve open state.

The other objects and features of this invention will become understood from the following description with reference to the accompanying drawings.

BRIEF DESCRIPTION OF THE DRAWINGS

FIG. 5 is a variable intake-valve lift and timing characteristic diagram, obtained by the intake-valve VEL and VTC mechanisms incorporated in the engine start control apparatus of the embodiment.

DESCRIPTION OF THE PREFERRED EMBODIMENTS

Figure 1:
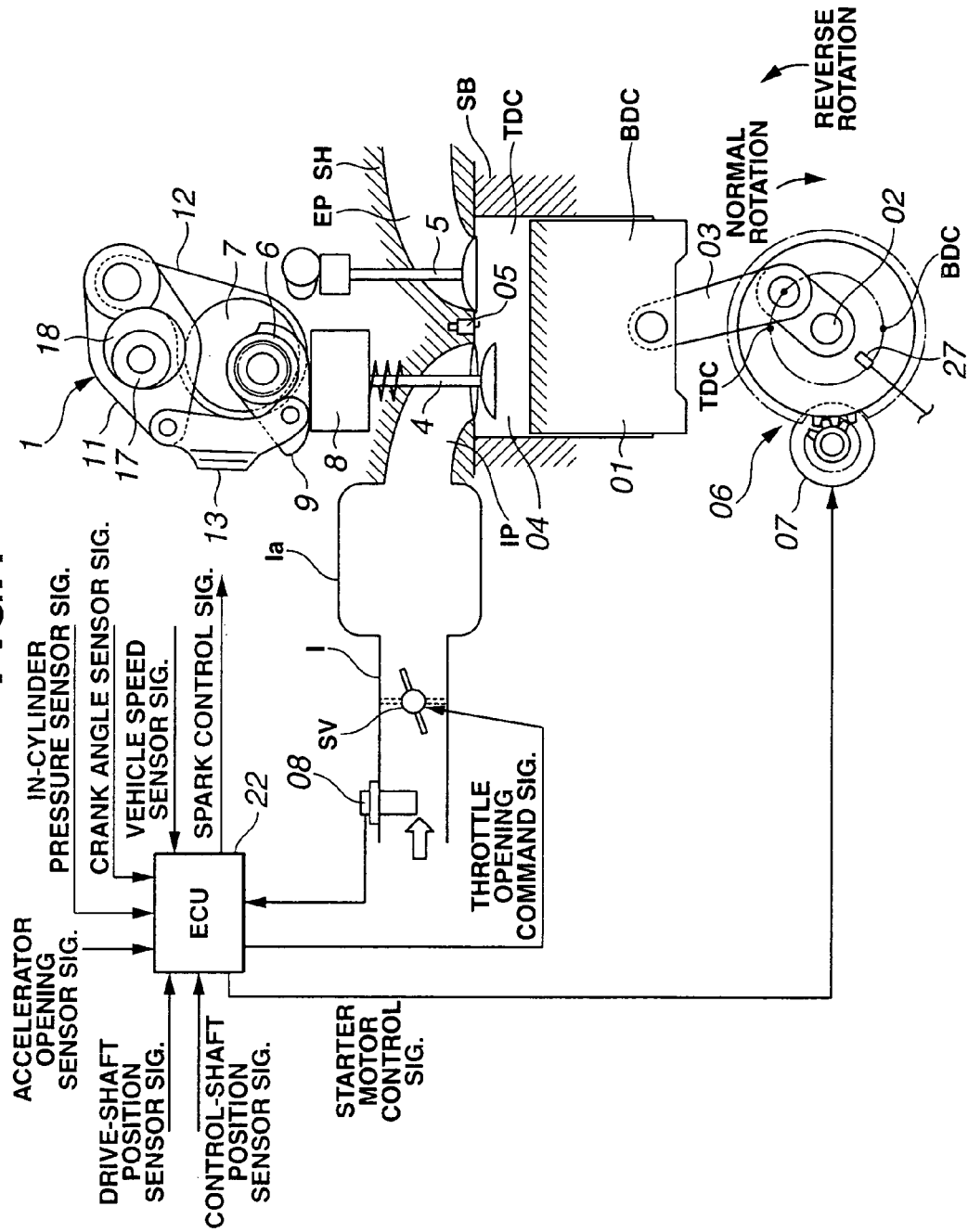
FIG. 1 is a schematic system diagram illustrating an internal combustion engine to which an engine start control apparatus of an embodiment can be applied.
Figure 2:
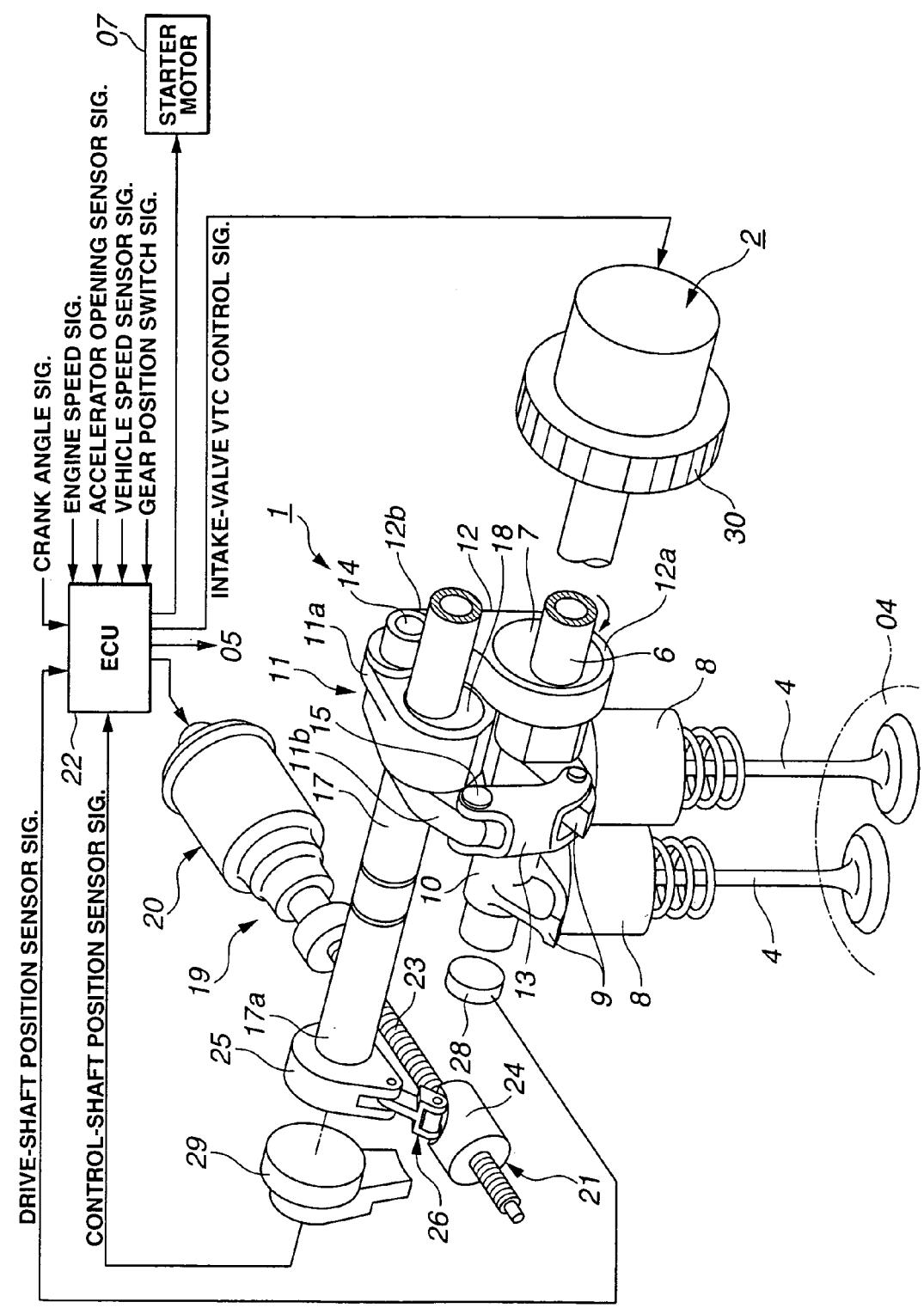
FIG. 2 is a perspective view illustrating an intake-valve operating control mechanism, incorporated in the engine start control apparatus of the embodiment, and comprised of a continuously variable intake valve event and lift control (VEL) mechanism and a variable intake valve timing control (VTC) mechanism.

Referring now to the drawings, particularly to FIGS. 1–2, the engine start control apparatus of the embodiment is exemplified in a four-cycle multiple-cylinder internal combustion engine having four valves per cylinder, namely two intake valves 4, 4 (see FIGS. 1–2) and two exhaust valves 5, 5 (see FIG. 1), and employing a variable valve operating device comprised of a variable intake-valve operating control mechanism.

The construction of the multiple-cylinder internal combustion engine, to which the engine start control apparatus of the embodiment can be applied, is hereunder described in reference to the system diagram of FIG. 1. The engine of FIG. 1 is constructed by a cylinder block SB having a cylinder bore, a reciprocating piston 01 movable or slidable through a stroke in the cylinder bore, a cylinder head SH on the cylinder block SB, an intake port IP and an exhaust port EP formed in cylinder head SH, the two intake valves 4, 4 slidably installed on cylinder head SH for opening and closing the opening end of intake port IP, and the two exhaust valves 5, 5 slidably installed on cylinder head SH for opening and closing the opening end of exhaust port EP. Piston 01 is connected to an engine crankshaft 02 via a connecting rod 03. A combustion chamber 04 is defined between the piston crown of piston 01 and the underside of cylinder head SH. An electronically-controlled throttle valve unit SV is provided upstream of intake port IP and located in an interior space of an intake manifold Ia of an intake pipe I connected to intake port IP, for controlling a quantity of intake air. The intake-air quantity may be mainly controlled by means of the variable valve operating control device (detailed later), while electronically-controlled throttle valve unit SV may be provided to subsidiarily control a quantity of intake air for safety purposes and for creating a vacuum existing in the induction system for the purpose of recirculation of blow-by fumes in a blowby-gas recirculation system and/or canister purging in an evaporative emission control system, usually installed on practicable internal combustion engines. Electronically-controlled throttle valve unit SV is comprised of a round-disk throttle valve, a throttle position sensor, and a throttle actuator that is driven by means of an electric motor such as a step motor. The throttle position sensor is provided to detect the actual throttle opening amount of the throttle valve. The throttle actuator adjusts the throttle opening amount in response to a control command signal from a controller, exactly, an electronic engine control unit (ECU) 22 (described later). A fuel injector or a fuel injecting valve (not shown) is provided downstream of throttle valve unit SV. A spark plug 05 is located substantially in a middle of cylinder head SH.

As clearly shown in FIG. 1, engine crankshaft 02 can be rotated in a reverse-rotational direction and in a normal-rotational direction via a pinion gear mechanism 06 by means of a reversible starter motor (or a reversible cranking motor) 07.

As clearly shown in FIGS. 1–2, particularly, in FIG. 2, the variable valve operating device includes an intake-valve operating control mechanism, comprised of a continuously variable intake valve event and lift control (VEL) mechanism and a variable intake valve timing control (VTC) mechanism (or an intake-valve phase control mechanism). Intake-valve VEL mechanism 1 is able to continuously control or adjust an intake-valve lift and lifted-period (working angle or valve open period) characteristic for both of intake valves 4, 4. Intake-valve VTC mechanism 2 is able to advance or retard a phase of each of intake valves 4, 4. As the intake-valve VEL mechanism 1, the apparatus of the embodiment uses a VEL mechanism as disclosed in Japanese Patent Provisional Publication No. 2003-172112. Briefly speaking, as shown in FIG. 2, intake-valve VEL mechanism 1 is comprised of a cylindrical hollow drive shaft 6, a ring-shaped drive cam 7, two rockable cams 9, 9, and a multinodular-link motion transmitting mechanism (or a motion converter) mechanically linked between drive cam 7 and the rockable-cam pair (9, 9) for transmitting a torque created by drive cam (eccentric cam) 7 as an oscillating force of each of rockable cams 9, 9. Cylindrical hollow drive shaft 6 is rotatably supported by bearings in the upper part of cylinder head SH. Drive cam 7 is formed as an eccentric cam that is press-fitted or integrally connected onto the outer periphery of drive shaft 6. Rockable cams 9, 9 are oscillatingly or rockably supported on the outer periphery of drive shaft 6 and in sliding-contact with respective upper contact surfaces of two valve lifters 8, 8, which are located at the valve stem ends of intake valves 4, 4. In other words, the motion transmitting mechanism (or the motion converter) is provided to convert a rotary motion (input torque) of drive cam 7 into an up-and-down motion (a valve opening force) of each intake valve 4 (i.e., an oscillating force creating an oscillating motion of each rockable cam 9).

Torque is transmitted from engine crankshaft 04 via a timing chain (not shown) to drive shaft 6. As indicated by the arrow in FIG. 2, the direction of rotation of drive shaft 6 is set in a clockwise direction.

Drive cam 7 has an axial bore that is displaced from the geometric center of the cylindrical drive cam 7. Drive cam 7 is fixedly connected to the outer periphery of drive shaft 6, so that the inner peripheral surface of the axial bore of drive cam 7 is press-fitted onto the outer periphery of drive shaft 6. Thus, the center of drive cam 7 is offset from the shaft center of drive shaft 6 in the radial direction by a predetermined eccentricity (or a predetermined offset value).

As best seen from the axial rear views shown in FIGS. 3A–3B and 4A–4B, each of rockable cams 9, 9 is formed as a substantially raindrop-shaped cam. Rockable cams 9, 9 have the same cam profile. Rockable cams 9, 9 are formed integral with respective axial ends of a cylindrical-hollow camshaft 10. Cylindrical-hollow camshaft 10 is rotatably supported on drive shaft 6. The outer peripheral contacting surface of rockable cam 9, in sliding-contact with the upper contact surface of valve lifter 8, includes a cam surface 9a. The base-circle portion of rockable cam 9 is integrally formed with or integrally connected to camshaft 10, to permit oscillating motion of rockable cam 9 on the axis of drive shaft 6. The outer peripheral surface (cam surface 9a) of rockable cam 9 is constructed by a base-circle surface, a circular-arc shaped ramp surface extending from the base-circle surface to a cam-nose portion, a top-circle surface (simply, a top surface) that provides a maximum valve lift (or a maximum lift amount), and a lift surface by which the ramp surface and the top surface are joined. The base-circle surface, the ramp surface, the lift surface, and the top surface abut predetermined positions of the upper surface of valve lifter 8, depending on the oscillatory position of rockable cam 9.

The motion transmitting mechanism (the motion converter) is comprised of a rocker arm 11 laid out above drive shaft 6, a link arm 12 mechanically linking one end (or a first armed portion 11a) of rocker arm 11 to the drive cam 7, and a link rod 13 mechanically linking the other end (a second armed portion 11b) of rocker arm 11 to the camnose portion of rockable cam 9.

Rocker arm 11 is formed with an axially-extending center bore (a through opening). The rocker-arm center bore of rocker arm 11 is rotatably fitted onto the outer periphery of a control cam 18 (described later), to cause a pivotal motion (or an oscillating motion) of rocker arm 11 on the axis of control cam 18. The first armed portion 11a of rocker arm 11 extends from the axial center bore portion in a first radial direction, whereas the second armed portion 11b of rocker arm 11 extends from the axial center bore portion in a second radial direction substantially opposite to the first radial direction. The first armed portion 11a of rocker arm 11 is rotatably pin-connected to link arm 12 by means of a connecting pin 14, while the second armed portion 11b of rocker arm 11 is rotatably pin-connected to one end (a first end 13a) of link rod 13 by means of a connecting pin 15.

Link arm 12 is comprised of a comparatively large-diamtere annular base portion 12a and a comparatively small-diameter protruding end portion 12b radially outwardly extending from a predetermined portion of the outer periphery of large-diameter annular base portion 12a. Large-diameter annular base portion 12a is formed with a drive-cam retaining bore, which is rotatably fitted onto the outer periphery of drive cam 7. On the other hand, small-diameter protruding end portion 12b of link arm 12 is pin-connected to the first armed portion 11a of rocker arm 11 by means of connecting pin 14.

Link rod 13 is pin-connected at the other end (a second end 13b) to the cam-nose portion of rockable cam 9 by means of a connecting pin 16.

Also provided is a motion-converter attitude control mechanism that changes an initial actuated position (a fulcrum of oscillating motion of rocker arm 11) of the motion transmitting mechanism (or the motion converter). As clearly shown in FIGS. 3A–3B and 4A–4B, the attitude control mechanism includes a control shaft 17 and control cam 18. Control shaft 17 is located above and arranged in parallel with drive shaft 6 in such a manner as to extend in the longitudinal direction of the engine, and rotatably supported on cylinder head SH by means of the same bearing members as drive shaft 6. Control cam 18 is attached to the outer periphery of control shaft 17 and slidably fitted into and oscillatingly supported in a control-cam retaining bore formed in rocker arm 11. Control cam 18 serves as a fulcrum of oscillating motion of rocker arm 11. Control cam 18 is integrally formed with control shaft 17, so that control cam 18 is fixed onto the outer periphery of control shaft 17. Control cam 18 is formed as an eccentric cam having a cylindrical cam profile. The axis (the geometric center) of control cam 18 is displaced a predetermined distance from the axis of control shaft 17.

As shown in FIG. 2, the attitude control mechanism also includes a drive mechanism 19. Drive mechanism 19 is comprised of a geared motor or an electric control-shaft actuator 20 fixed to one end of a housing (not shown) and a ball-screw motion-transmitting mechanism (simply, a ball-screw mechanism) 21 that transmits a motor torque created by motor 20 to control shaft 17. In more detail, motor 20 is constructed by a proportional control type direct-current (DC) motor. Motor 20 is controlled in response to a control signal, which is generated from the output interface circuitry of ECU 22 and whose signal value is determined based on engine/vehicle operating conditions. Ball-screw mechanism 21 is comprised of a ball-screw shaft (or a worm shaft) 23 coaxially aligned with and connected to the motor output shaft of motor 20, a substantially cylindrical, movable ball nut 24 threadably engaged with the outer periphery of ball-screw shaft 23, a link arm 25 fixedly connected to the rear end 17a of control shaft 17, a link member 26 mechanically linking link arm 25 to ball nut 24, and recirculating balls interposed between the worm teeth of ball-screw shaft 23 and grooves cut in the inner peripheral wall surface of ball nut 24. In a conventional manner, a rotary motion (input torque) of ball-screw shaft 23 is converted into a rectilinear motion of ball nut 24.

Figure 3A:
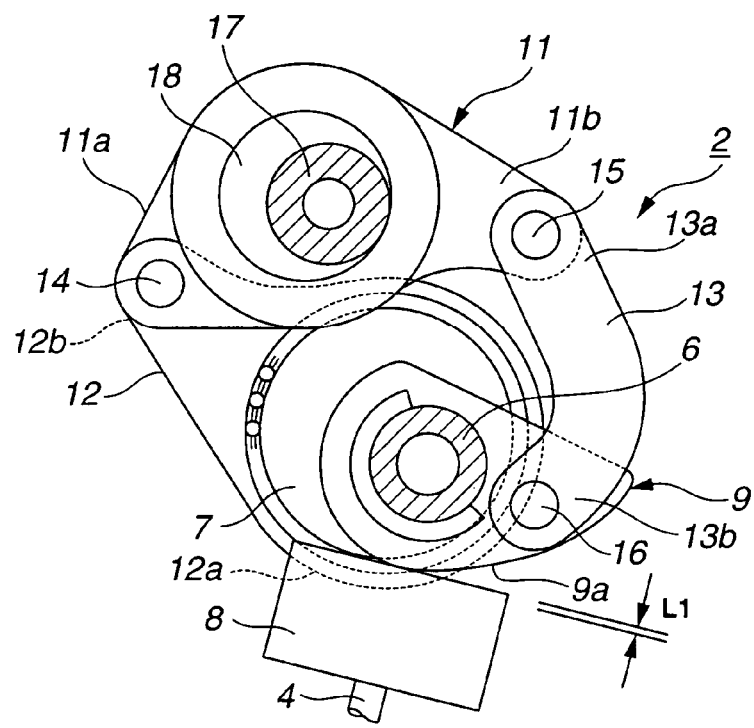
FIGS. 3A–3B are axial rear views showing the operation of the intake-valve VEL mechanism during a small-lift control mode.
Figure 3B:
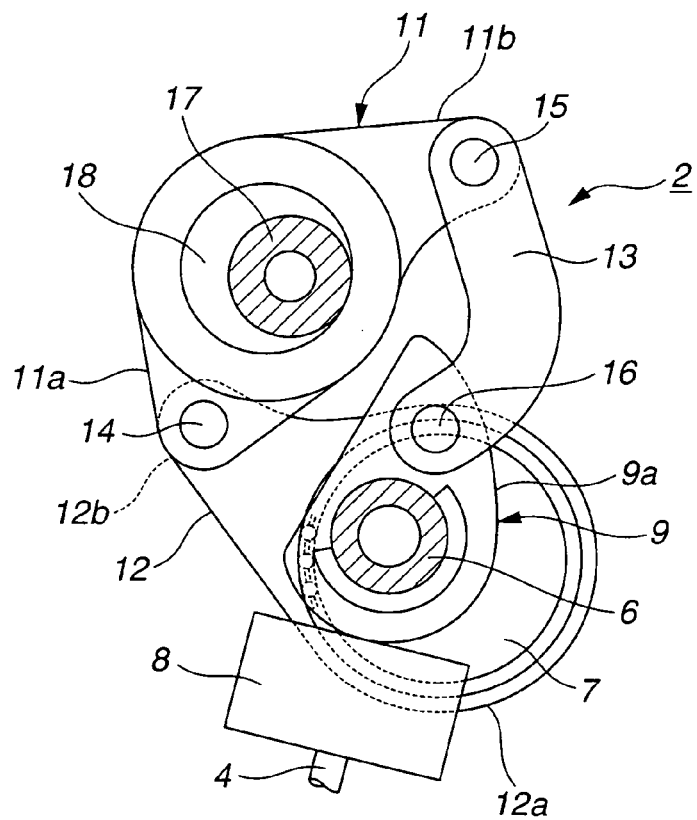
Figure 4A:
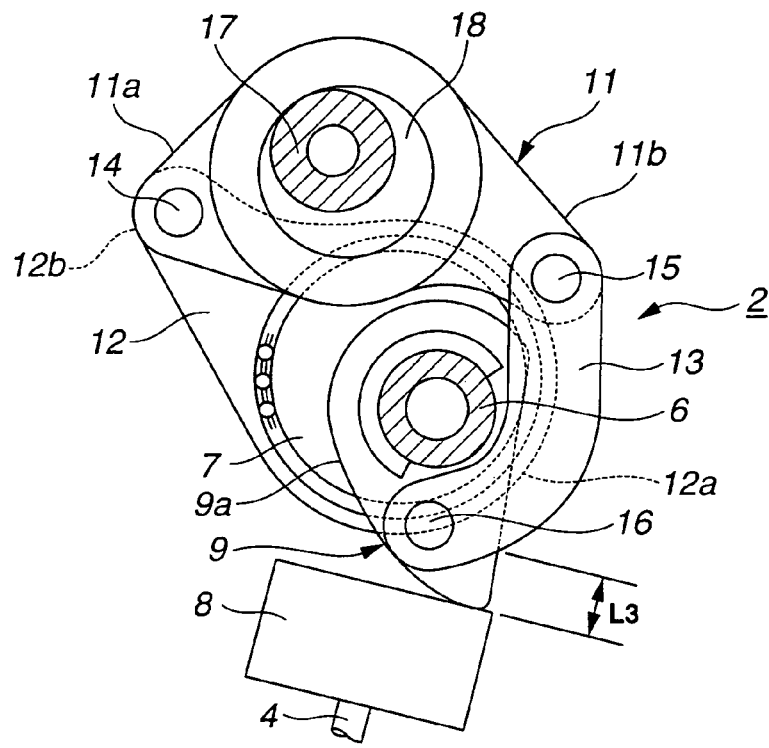
FIGS. 4A–4B are axial rear views showing the operation of the intake-valve VEL mechanism during a large-lift control mode.
Figure 4B:
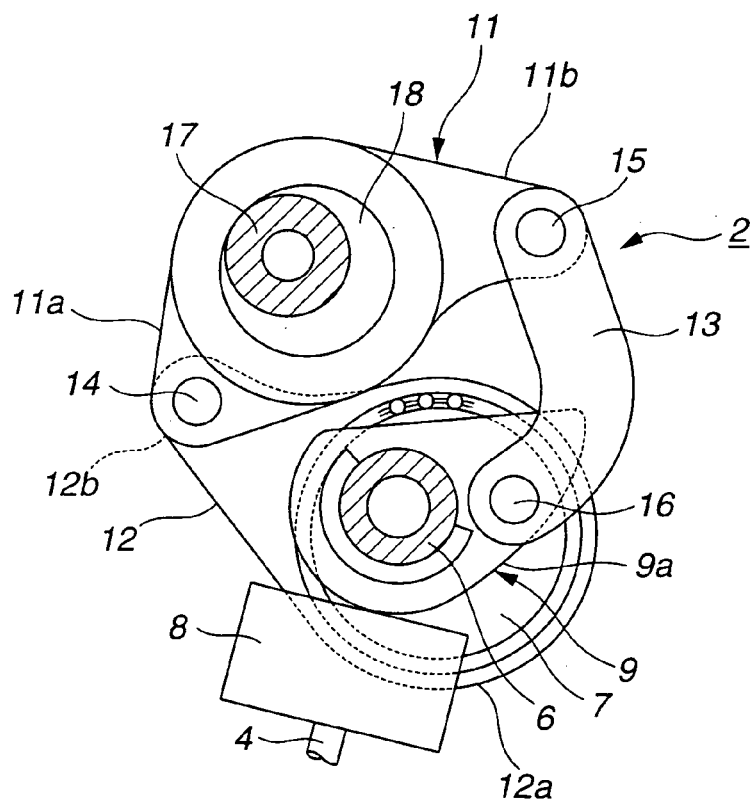

Hereunder described briefly in reference to FIGS. 2, 3A–3B, 4A–4B, and 5 is the operation of intake-valve VEL mechanism 1. In a low load range, such as during cruising of the vehicle at low engine load operation or during vehicle coasting at low engine load operation, motor 20 of intake-valve VEL mechanism 1 is driven in response to a control signal generated from the output interface of ECU 22 and determined based on the low engine load condition. Thus, ball-screw shaft 23 is rotated by input torque created by motor 20, thereby producing a maximum rectilinear motion of ball nut 24 in one ball-nut axial direction. As a result, control shaft 17 rotates in one rotational direction via a linkage comprised of link member 26 and link arm 25. As can be seen from the angular position of control cam 18 shown in FIGS. 3A–3B, by way of revolving motion of the center of control cam 18 around the center of control shaft 17, the radially thick-walled portion of control cam 18 shifts upwards apart from drive shaft 6 and is held at the upwardly shifted position, with the result that the pivot (the connected point by connecting pin 15) between the second armed portion 11b of rocker arm 11 and the first rod end 13a of link rod 13 also shifts upwards with respect to drive shaft 6. As a result, the cam-nose portion of each of rockable cams 9, 9 is forcibly pulled up via the second rod end 13b of link rod 13. As viewed from the rear end of drive shaft 6, the angular position of each rockable cam 9 shown in FIGS. 3A–3B is relatively shifted to the counterclockwise direction from the angular position of each of rockable cam 9 shown in FIGS. 4A–4B. With control cam 18 held at the angular position shown in FIGS. 3A–3B, when drive cam 7 is rotated, a rotary motion of drive cam 7 is converted through link arm 12, the first armed portion 11a of rocker arm 11, the second armed portion 11b of rocker arm 11, and link rod 13 into an oscillating motion of rockable cam 9, but almost the base-circle surface area of rockable cam 9 is brought into sliding-contact with the upper contact surface of valve lifter 8 (see FIGS. 3A–3B). Thus, the actual intake-valve lift becomes a small lift L1 and simultaneously the actual intake-valve working angle becomes a small working angle D1 (see the small intake-valve lift L1 and small working angle D1 characteristic shown in FIG. 5). As a result of this, a friction loss of the intake valve operating system can be reduced. Additionally, owing to the phase-retarded intake valve open timing of each of intake valves 4, a valve overlap period, during which the open periods of intake and exhaust valves 4 and 5 are overlapped, tends to decrease, thus enhancing combustion stability and improving fuel economy.

When the engine/vehicle operating condition is shifted from a low load range to a middle load range, motor 20 is driven in the reverse-rotational direction responsively to a control signal, which is generated from the output interface of ECU 22 and determined based on the middle engine load condition. Thus, ball-screw shaft 23 is also rotated in the reverse-rotational direction by reverse-rotation of the motor output shaft of motor 20, thereby producing the opposite rectilinear motion of ball nut 24. As a result, control shaft 17 rotates in the opposite rotation direction via the linkage (25, 26). By way of revolving motion of the center of control cam 18 around the center of control shaft 17, the radially thick-walled portion of control cam 18 slightly downwardly shifts toward drive shaft 6 and is held at the slightly downwardly shifted position. Thus, the attitude of rocker arm 11 slightly shifts clockwise from the angular position of rocker arm 11 shown in FIGS. 3A–3B, with the result that the pivot (the connected point by connecting pin 15) between the second armed portion 11b of rocker arm 11 and the first rod end 13a of link rod 13 also shifts slightly downwards. As a result, the cam-nose portion of each of rockable cams 9, 9 is forcibly slightly pushed down via the second rod end 13b of link rod 13. As viewed from the rear end of drive shaft 6, the angular position of each of rockable cams 9 is relatively shifted to the clockwise direction from the angular position of each of rockable cam 9 shown in FIGS. 3A–3B. With control cam 18 shifted from the angular position (suited to low load operation) shown in FIGS. 3A–3B to the intermediate angular position (suited to middle load operation) located in a substantially middle of the angular position shown in FIGS. 3A–3B and the angular position shown in FIGS. 4A–4B, during rotation of drive cam 7, a rotary motion of drive cam 7 is converted through link arm 12, the first armed portion 11a of rocker arm 11, the second armed portion 11b of rocker arm 11, and link rod 13 into an oscillating motion of rockable cam 9. At this time, a part of the base-circle surface area, the ramp surface area, the lift surface area, and the top surface area are brought into sliding-contact with the upper contact surface of valve lifter 8. Thus, when varying from the angular position (suited to low load operation) of control cam 18 shown in FIGS. 3A–3B to the intermediate angular position (suited to middle load operation), the actual intake-valve lift and working angle characteristic can be quickly varied from the small intake-valve lift L1 and small working angle D1 characteristic to a middle intake-valve lift L2 and middle working angle D2 characteristic (see FIG. 5).

After this, when the engine/vehicle operating condition is shifting from the middle load range to a high load range, motor 20 is further driven in the reverse-rotational direction responsively to a control signal, which is generated from the output interface of ECU 22 and determined based on the high engine load condition. Thus, ball-screw shaft 23 is further rotated in the reverse-rotational direction by reverse-rotation of the motor output shaft of motor 20, thereby producing the further opposite rectilinear motion of ball nut 24. As a result, control shaft 17 further rotates in the opposite rotation direction via the linkage (25, 26). By way of further revolving motion of the center of control cam 18 around the center of control shaft 17, the radially thick-walled portion of control cam 18 further shifts downwards and is held at the downwardly shifted position. Thus, the attitude of rocker arm 11 further shifts clockwise, with the result that the pivot (the connected point by connecting pin 15) between the second armed portion 11b of rocker arm 11 and the first rod end 13a of link rod 13 further shifts downwards. As a result, the cam-nose portion of each of rockable cams 9, 9 is further forcibly pushed down via the second rod end 13b of link rod 13. As viewed from the rear end of drive shaft 6, the angular position of each rockable cam 9 is further shifted clockwise. With control cam 18 shifted from the intermediate angular position (suited to middle load operation) located in the substantially middle of the angular position shown in FIGS. 3A–3B and the angular position shown in FIGS. 4A–4B to the angular position (suited to high load operation) shown in FIGS. 4A–4B, during rotation of drive cam 7, a rotary motion of drive cam 7 is converted through the motion transmitting mechanism (links 11, 12, and 13) into an oscillating motion of rockable cam 9. At this time, a part of the base-circle surface area, the ramp surface area, the lift surface area, and the top surface area are brought into sliding-contact with the upper contact surface of valve lifter 8. Thus, when varying from the intermediate angular position (suited to middle load operation) of control cam 18 to the angular position (suited to high load operation) shown in FIGS. 4A–4B, the actual intake-valve lift and working angle characteristic can be continuously varied from the middle intake-valve lift L2 and middle working angle D2 characteristic to a high intake-valve lift L3 and high working angle D3 characteristic (see FIG. 5).

As can be appreciated from a plurality of intake-valve lift L and intake-valve working angle D characteristic curves (or a plurality of intake-valve lift L and lifted-period D characteristic curves) shown in FIG. 5, according to the intake-valve VEL mechanism 1 of the engine stop control apparatus of the embodiment, through all engine operating conditions from a low engine load condition to a high engine load condition, the intake-valve lift and working angle characteristic can be continuously controlled or adjusted from the small intake-valve lift L1 and working angle D1 characteristic via the middle intake-valve lift L2 and working angle D2 characteristic to the large intake-valve lift L3 and working angle D3 characteristic, or vice versa. That is to say, the intake-valve lift and working angle characteristic can be controlled or adjusted to an optimal characteristic suited to the latest up-to-date information concerning engine operating condition, in particular, engine load.

As the intake-valve VTC mechanism 2, the apparatus of the shown embodiment uses a hysteresis-brake equipped VTC mechanism as disclosed in Japanese Patent Provisional Publication No. 2004-11537. Briefly speaking, a relative phase-angle variator (a relative phase varying means) is provided between a drive ring (a substantially cylindrical-hollow timing sprocket member or a substantially cylindrical-hollow timing pulley 30) driven by the crankshaft and a driven member fixedly connected to the front end of drive shaft 6, for varying an angular phase of drive shaft 6 (the driven member) relative to timing pulley 30 (the drive ring). The operation of the hysteresis brake of the VTC mechanism is controlled in response to a control current, which is generated from ECU 22 and whose current value is properly adjusted or regulated depending on the latest up-to-date information about an engine/vehicle operating condition, such that a phase of intake valve 4, which is represented in terms of a crankangle CR, is properly controlled (phase-advanced or phase-retarded). Instead of using the hysteresis-brake equipped VTC mechanism, a hydraulically-operated VTC mechanism may be used.

Figure 8:
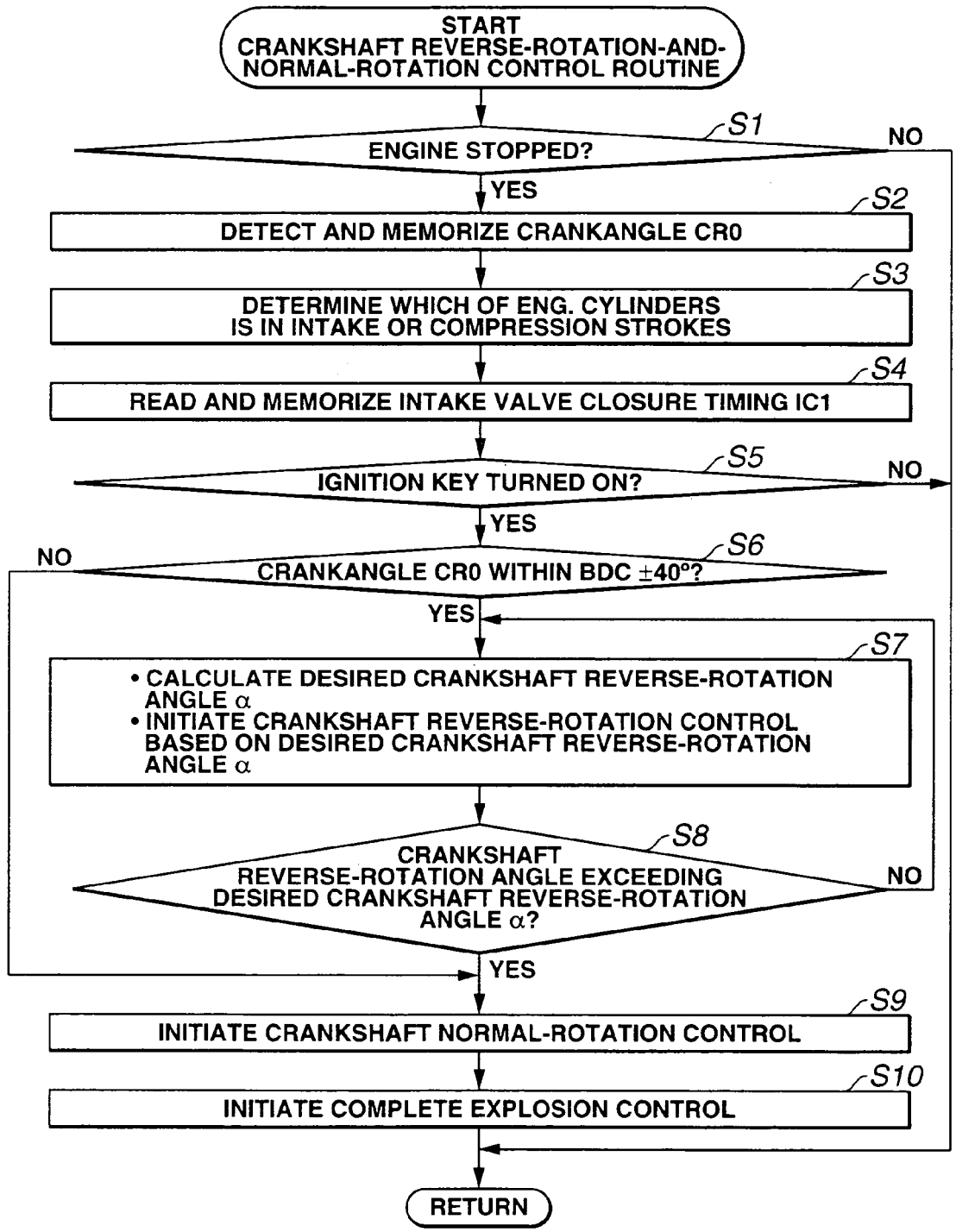
FIG. 8 is a flow chart showing a crankshaft reverse-rotation-and-normal-rotation control routine executed within the controller incorporated in the engine start control apparatus of the embodiment.
Figure 9:
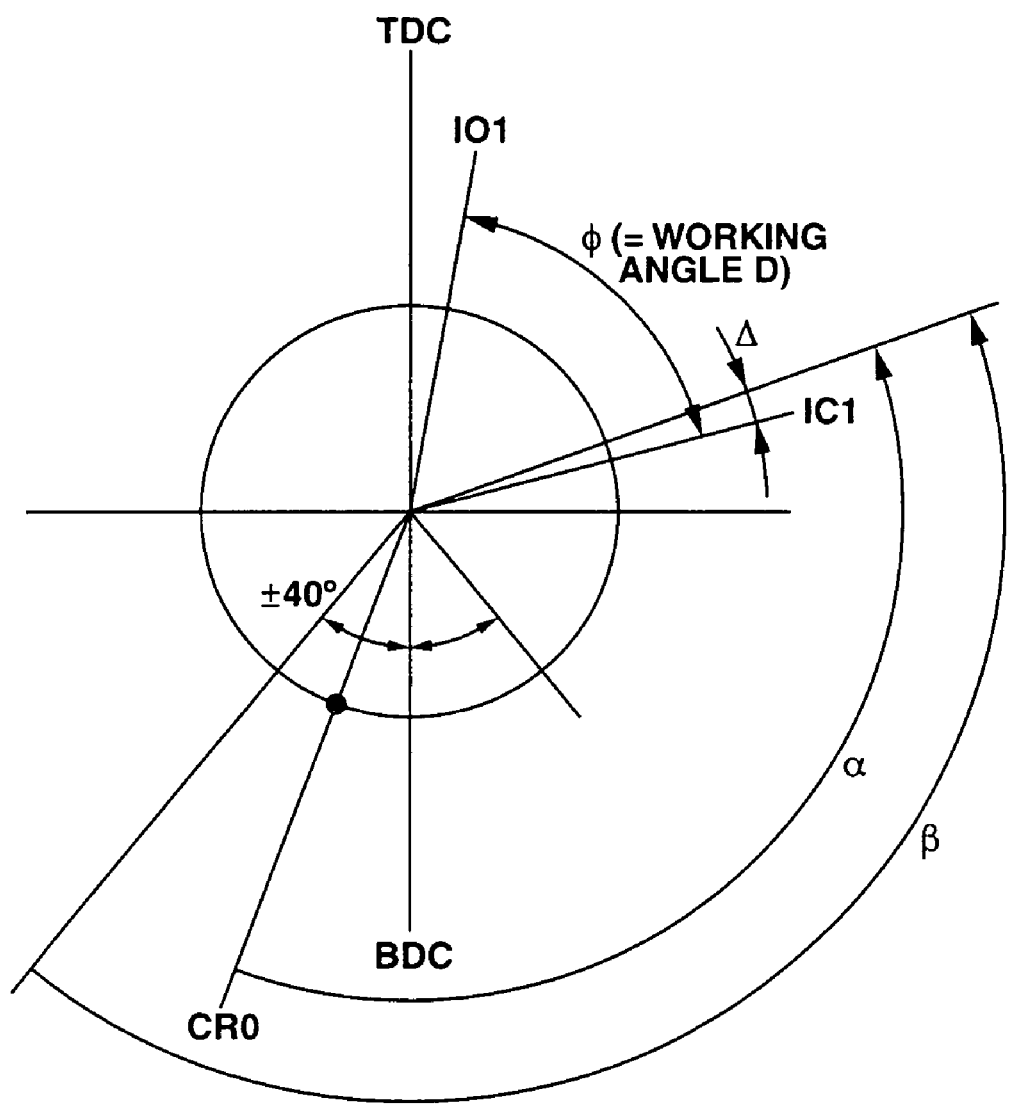
FIG. 9 is a crankangle characteristic diagram used to calculate a desired reverse-rotation angle for crankshaft reverse-rotation-and-normal-rotation control.
Figure 10:
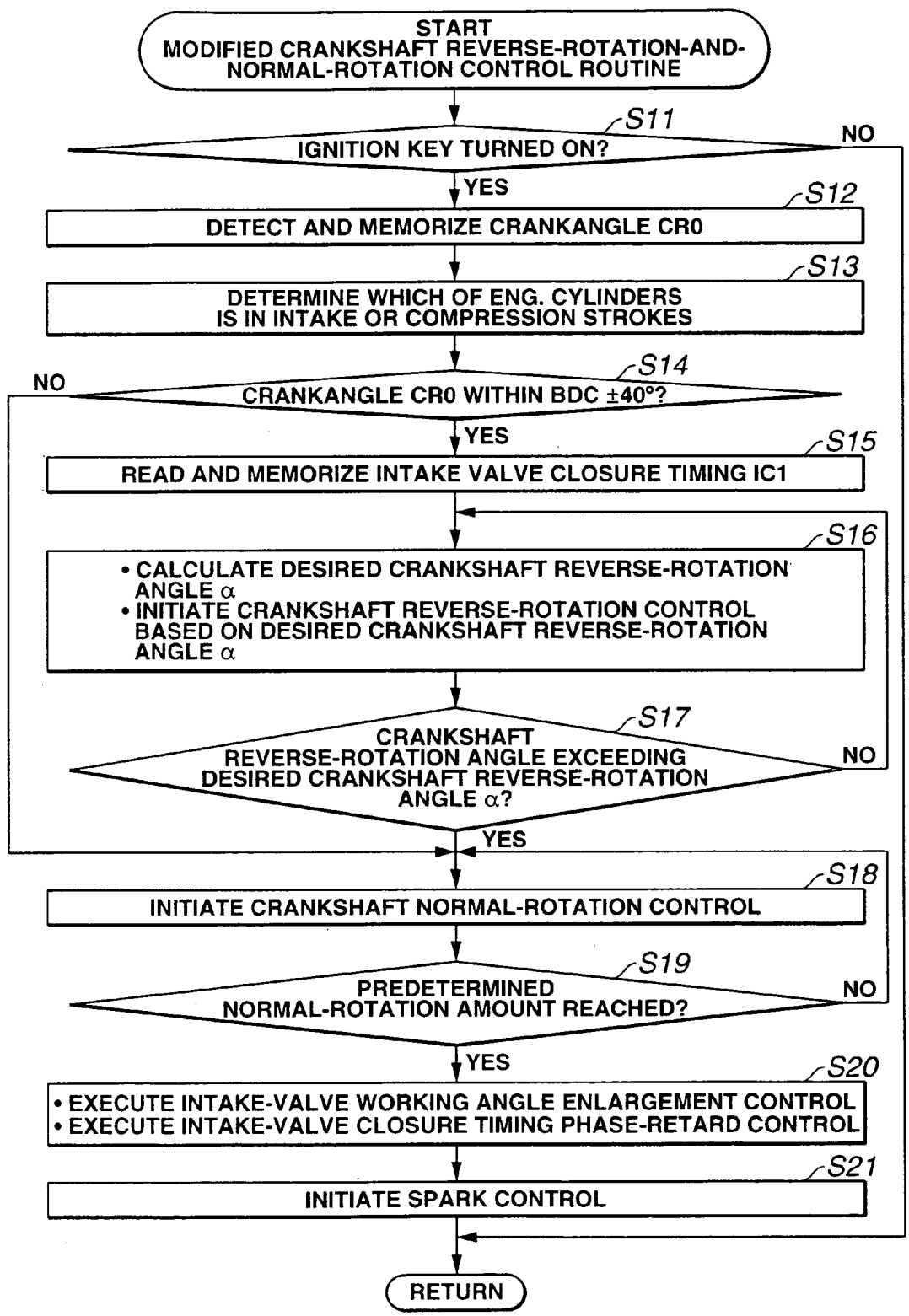
FIG. 10 is a flow chart showing a modified crankshaft reverse-rotation-and-normal-rotation control routine.
Figure 11:
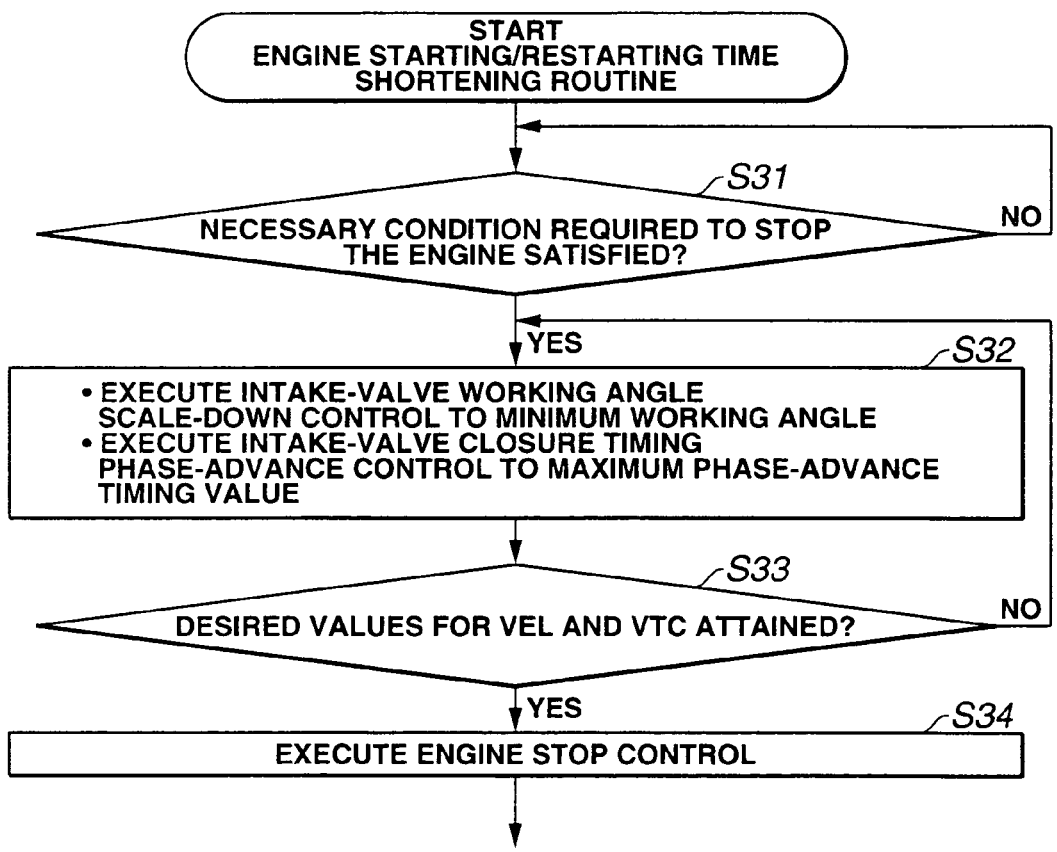
FIG. 11 is a flow chart showing an engine starting/restarting time shortening routine.

Before execution of crankshaft reverse-rotation control (described in detail in reference to the flow charts shown in FIGS. 8, 10, 11), the intake valve closure timing of intake valve 4 is controlled to or brought closer to a preset intake valve closure timing value IC1 before the B.D.C. position of piston 01, for example, a timing value closer to substantially 90 degrees of crankangle before the B.D.C. position. Therefore, a piston stroke of piston 01, obtained during the intake-valve open period, tends to be shortened in comparison with a usual piston stroke obtained during a standard intake-valve open period.

In the apparatus of the embodiment, the variable phase control executed by intake-valve VTC mechanism 2 is combined with the continuous VEL control executed by intake-valve VEL mechanism 1. For execution of intake-valve phase control, ECU 22 outputs a control current (control command signal) to intake-valve VTC mechanism 2 to advance or retard a phase of each of intake valves 4, 4 depending on the latest up-to-date information about an engine/vehicle operating condition. Simultaneously with the intake-valve phase control, ECU 22 can execute intake-valve lift and working angle control for intake-valve VEL mechanism 1. By combining the intake-valve phase control with the intake-valve lift and working angle control, it is possible to enhance or improve various engine performances during operation of the engine.

In more detail, as shown in FIGS. 1–2, the controller (ECU) 22 comprises a microcomputer. ECU 22 includes an input/output interface (I/O), memories (RAM, ROM), and a microprocessor or a central processing unit (CPU). The input/output interface (I/O) of ECU 22 receives input information from various engine/vehicle switches and sensors, namely a crank angle sensor 27, an engine speed sensor, an accelerator opening sensor, a vehicle speed sensor, a range gear position switch, a drive-shaft angular position sensor 28, a control-shaft angular position sensor 29, an airflow meter 08, an engine temperature sensor (not shown), and an in-cylinder pressure sensor 50 (see FIG. 1). The processor of ECU 22 determines the current engine/vehicle operating condition, based on input information from the engine/vehicle switches and sensors. Crank angle sensor 27 is provided to detect an angular position (crankangle CR) of crankshaft 02. Drive-shaft angular position sensor 28 is provided for detecting an angular position of drive shaft 6, and for detecting or determining or discriminating a piston stroke (e.g., a combustion stroke, an intake stroke, a compression stroke, and so on) of each of engine cylinders. Control-shaft angular position sensor 29 is provided to detect an angular position of control shaft 17. Airflow meter 08 is provided for measuring or detecting a quantity of air flowing through intake pipe I, and consequently for detecting or estimating the magnitude of engine load. Within ECU 22, the central processing unit (CPU) allows the access by the I/O interface of input informational data signals from the previously-discussed engine/vehicle switches and sensors. The CPU of ECU 22 is responsible for carrying the control program stored in memories and is capable of performing necessary arithmetic and logic operations containing the automatic engine start control processing (containing crankshaft reverse-rotation-and-normal-rotation control performed by reversible starter motor 07), in addition to electronic throttle opening control achieved through the throttle actuator of electronically-controlled throttle valve unit SV, electronic fuel injection control achieved by the electronic fuel-injection system, electronic spark control achieved by the electronic ignition system, intake-valve lift and working angle control executed by intake-valve VEL mechanism 1, and phase control executed by intake-valve VTC mechanism 2. Computational results (arithmetic calculation results), that is, calculated output signals are relayed through the output interface circuitry of ECU 22 to output stages, namely the throttle actuator of electronically-controlled throttle valve unit SV, electronically-controlled fuel injectors of the fuel-injection system, electronically-controlled spark plugs 05 of the electric ignition system, motor 20 of intake-valve VEL mechanism 1, an electromagnetic coil of the hysteresis brake of intake-valve VTC mechanism 2, reversible starter motor (reversible cranking motor) 07 used for crankshaft reverse-rotation-and-normal-rotation control (described in detail in reference to the flow chart shown in FIG. 8) achieved by the engine start control apparatus of the embodiment.

As is generally known, one complete operating cycle of the four-cycle engine, that is, the entire cycle of events of the four-cycle engine is completed in four piston strokes, which are intake, compression, expansion, and exhaust, in other words, two revolutions (i.e., 720 degrees) of crankshaft 02. On the other hand, drive shaft 6 is driven by crankshaft 02 at ½ (i.e., 360 degrees) the speed of crankshaft 02. Therefore, it is possible to determine or discriminate which of engine cylinders is in a combustion stroke, by detecting the angular position of drive shaft 6 by drive-shaft angular position sensor 28. For instance, there are two different 90° crankangles, namely, 90 degrees of crankangle after the T.D.C. position on intake stroke and 90 degrees of crankangle after the T.D.C. position on expansion stroke. On the other hand, there is a phase difference of 180 degrees in rotation angle of drive shaft 6. Thus, by detecting the rotation angle of drive shaft 6, it is possible to determine or discriminate whether the piston-stroke position is in ATDC 90° on intake stroke or in ATDC 90° on expansion stroke. Actually, an angular phase of drive shaft 6 is slightly changed by operating intake-valve VTC mechanism 2. However, such a slight angular-phase shift of drive shaft 6 does not cause any trouble for piston-stroke discrimination for each engine cylinder. As a matter of course, the intake-valve lift and working angle characteristic curve can be phase-shifted (phase-advanced or phase-retarded) by operating intake-valve VTC mechanism 2. The phase shift of the intake-valve lift and working angle characteristic curve occurs due to a phase difference between drive shaft 6 and timing pulley 30. Thus, it is possible to detect the phase difference by detecting the angular position of drive shaft 6 by means of drive-shaft angular position sensor 28. As previously described, the intake-valve lift and working angle characteristic can be continuously controlled or adjusted from the small intake-valve lift L1 and working angle D1 characteristic via the middle intake-valve lift L2 and working angle D2 characteristic to the large intake-valve lift L3 and working angle D3 characteristic, or vice versa, by rotating control shaft 17 of the motion-converter attitude control mechanism of intake-valve VEL mechanism 1 within a limited angular range. At this time, there is a one-to-one correspondence between the angular position (rotation angle) of control shaft 17 and the intake-valve lift L and working angle D characteristic (the intake-valve lift amount L and the intake-valve lifted period D). Therefore, it is possible to detect the working angle of each of intake valves 4, 4 by detecting the angular position (rotation angle) of control shaft 17 by means of control-shaft angular position sensor 29.

Controller (ECU) 22, incorporated in the engine start control apparatus of the embodiment, is configured to calculate or compute, based on sensor signals from crank angle sensor 27, drive-shaft angular position sensor 28, and control-shaft angular position sensor 29, an angle of rotation of crankshaft 02 from a first crankangle of crankshaft 02, detected just after the engine has been stopped by turning an ignition switch (or an ignition key) OFF, to a second crankangle that each of intake valves 4, 4 begins to open by way of reverse rotation of crankshaft 02. And then, controller (ECU) 22 executes crankshaft reverse-rotation control, based on the computed rotation angle of crankshaft 02 from the first crankangle of crankshaft 02, detected just after the engine has been stopped by turning the ignition switch OFF, to the second crankangle that each of intake valves 4, 4 begins to open by way of reverse rotation of crankshaft 02. The crankshaft reverse-rotation control executed by controller 22 during cranking for engine startup is hereunder described in detail in reference to the flow chart shown in FIG. 8. The crankshaft reverse-rotation control routine (exactly, the crankshaft reverse-rotation-and-normal-rotation control routine) shown in FIG. 8 is executed as time-triggered interrupt routines to be triggered every predetermined time intervals such as 10 milliseconds. At the early stage of the control routine of FIG. 8, the piston-stroke discrimination for each of engine cylinders of the multiple-cylinder engine is made under a condition where the engine has been stopped by turning the ignition switch OFF, in order to detect or discriminate which of engine cylinders is in a combustion stroke (or in an intake stroke or in a compression stroke) in the engine stopped state.

At step S1, a check is made to determine whether the engine has been stopped by turning the ignition key (the ignition switch) OFF. When the answer to step S1 is in the negative (NO), that is, when the engine has not yet been stopped with the ignition key turned OFF, one execution cycle of the routine terminates. When the answer to step S1 is in the affirmative (YES), that is, the engine has been stopped with the ignition key turned OFF, the routine proceeds from step S1 to step S2.

At step S2, a current crankangle CR0 of crankshaft 02, detected by crank angle sensor 27 just after the engine has been stopped by turning the ignition key OFF, is read. The current crankangle CR0 is memorized in a predetermined memory address.

At step S3, the processor of ECU 22 detects or determines or discriminates, based on the latest up-to-date informational signal from drive-shaft angular position sensor 28, which of engine cylinders is in an intake stroke or in a compression stroke. That is, drive-shaft angular position sensor 28 serves as a piston-stroke discrimination device or a piston-stroke position detector. Instead of discriminating, based on the latest up-to-date informational signal from drive-shaft angular position sensor 28, which of engine cylinders is in an intake stroke or in a compression stroke, the processor of ECU 22 may discriminate, based on the latest up-to-date informational signal from drive-shaft angular position sensor 28, which of engine cylinders is in an expansion stroke or in an exhaust stroke. That is, the processor of ECU 22 may discriminate, based on the latest up-to-date informational signal from drive-shaft angular position sensor 28, which of engine cylinders is in either one of intake and compression strokes or in either one of expansion and exhaust strokes.

At step S4, the intake valve closure timing IC1 of intake valve 4, estimated or calculated based on the latest up-to-date informational signals from drive-shaft angular position sensor 28 and control-shaft angular position sensor 29, is read. The intake valve closure timing IC1 is memorized in a predetermined memory address.

At step S5, a check is made to determine whether the ignition key has been turned ON for engine startup. When the answer to step S5 is in the negative (NO), that is, the ignition key has not yet been turned ON for engine startup, one execution cycle of the routine terminates. When the answer to step S5 is in the affirmative (YES), that is, the ignition key has already been turned ON for engine startup, the routine proceeds from step S5 to step S6.

At step S6, a check is made to determine whether a current piston-stroke position of an engine cylinder whose piston stroke is in the intake stroke or in the compression stroke, in other words, the current crankangle CR0 of crankshaft 02, read through step S2, is within a specified crankangle range from 40° crankangle (40 degrees of crankshaft rotation) before the B.D.C. position of piston 01 to 40° crankangle after the B.D.C. position. When the answer to step S6 is negative (NO), that is, the current crankangle CR0 of crankshaft 02 is out of the specified crankangle range from 40° crankangle BBDC to 40° crankangle ABDC, the processor of ECU 22 determines that the compression pressure at the T.D.C. position of piston 01 does not become so high. Thus, the routine jumps from step S6 to step S9, without initiating crankshaft reverse-rotation control. Conversely when the answer to step S6 is affirmative (YES), that is, the current crankangle CR0 of crankshaft 02 is within the specified crankangle range from 40° crankangle BBDC to 40° crankangle ABDC (i.e., in case of (40° CA BBDC) $\leq$ CR0 $\leq$ (40° CA ABDC)), the processor of ECU 22 determines that there is an increased tendency for the compression pressure at the T.D.C. position to become so high. Thus, the routine proceeds from step S6 to step S7, so as to initiate crankshaft reverse-rotation control by temporarily rotating crankshaft 02 in the reverse-rotational direction by means of reversible starter motor 07.

At step S7, ECU 22 outputs a control current to reversible starter motor 07 for temporarily rotating crankshaft 02 in the reverse-rotational direction. Before rotating crankshaft 02 in the reverse-rotational direction, the processor of ECU 22 calculates or computes a desired reverse-rotation angle of crankshaft 02 from the current crankangle CR0 of crankshaft 02 to a crankangle that intake valve 4 of the engine cylinder, whose piston stroke is in the intake stroke or in the compression stroke, begins to open by way of reverse rotation of crankshaft 02. As an example of calculation for the desired reverse-rotation angle of crankshaft 02, first, the crankangle of the initial stage of the engine start-up period is set to the current crankangle CR0, read through step S2. Second, a summed value (a threshold value) $\alpha$, obtained by adding a predetermined slight margin $\Delta$ to a reverse-rotation angle of crankshaft 02 from the current crankangle CR0 read through step S2 to the crankangle corresponding to intake valve closure timing IC1 estimated through step S4, is set as the desired crankshaft reverse-rotation angle.

At step S8, a check is made to determine whether the amount of reverse rotation of crankshaft 02, created during crankshaft reverse-rotation control, exceeds intake valve closure timing IC1 estimated through step S4, and thus the angular position of crankshaft 02, rotated in the reverse-rotational direction, is within an intake-valve open crankangle range X corresponding to an intake-valve open period defined between intake valve closure timing IC1 and an intake valve open timing IO1 of intake valve 4 just before intake valve closure timing IC1. Concretely, such a check is achieved by determining whether the crankshaft reverse-rotation angle exceeds the summed value $\alpha$ (the desired crankshaft reverse-rotation angle), serving as the threshold value. When the answer to step S8 is negative (NO), the routine returns from step S8 to step S7. Conversely when the answer to step S8 is affirmative (YES), the routine proceeds from step S8 to step S9.

At step S9, ECU 22 initiates crankshaft normal-rotation control by rotating crankshaft 02 in the normal-rotational direction by means of reversible starter motor 07. Just before switching from the reverse-rotational state of crankshaft 02 to the normal-rotational state, an applied torque (a motor torque) of the output shaft of reversible starter motor 07 is reduced or decreasingly compensated for by way of starter motor torque control. After step S9, step S10 occurs.

At step S10, switching from crankshaft reverse-rotation-and-normal-rotation control to complete explosion control occurs. That is, after the next engine control execution cycle, the entire cycle of events (four piston strokes) of the four-cycle engine is repeatedly executed for complete explosion in combustion chamber 04.

As discussed above, crankshaft 02 is continuously reverse-rotated by way of the temporary reverse rotation of crankshaft 02. Thereafter, when the angular position of crankshaft 02 passes through the crankangle corresponding to intake valve closure timing IC1 estimated through step S4, and then reaches a crankangle CR1 shown in FIG. 6, the angular position of crankshaft 02, reverse-rotated, shifts to within the intake-valve open crankangle range X corresponding to the intake-valve open period defined between intake valve closure timing IC1 and intake valve open timing IO1. As can be seen from the crankangle versus in-cylinder pressure characteristic curve indicated by the solid line in FIG. 7, owing to such a shift of the angular position of crankshaft 02 to a certain crankangle within the intake-valve open crankangle range X, the in-cylinder pressure, temporarily risen owing to an upstroke of piston 01 during reverse rotation of crankshaft 02 during the intake-valve closed period, lowers from a comparatively high in-cylinder pressure value (a) down to a pressure level corresponding to an atmospheric pressure value (b).

Figure 6:
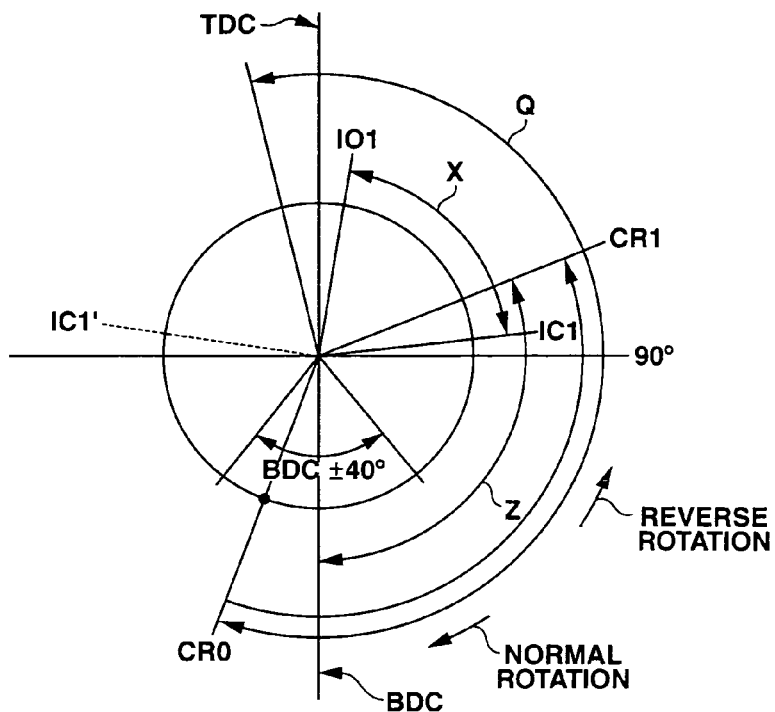
FIG. 6 is a crankangle characteristic diagram showing crankshaft reverse-rotation-and-normal-rotation control executed within a controller incorporated in the engine start control apparatus of the embodiment.
Figure 7:
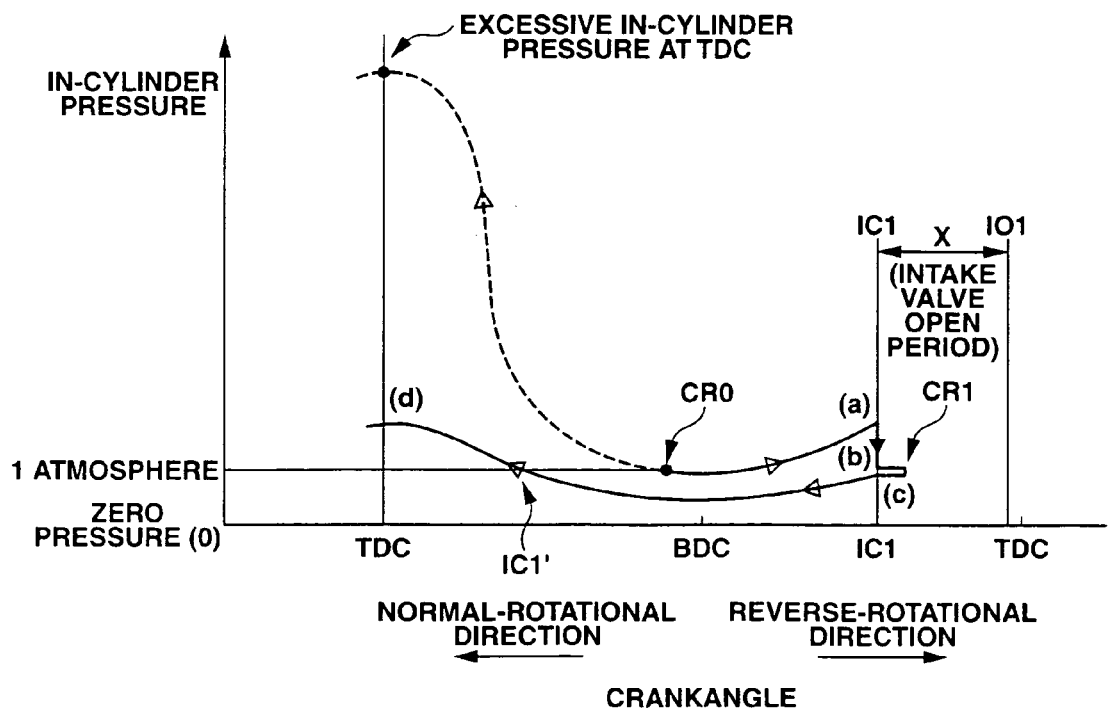
FIG. 7 shows the crankangle versus in-cylinder pressure characteristic curve (indicated by the solid line) obtained with the crankshaft reverse-rotation-and-normal-rotation control of the engine start control apparatus of the embodiment, and the crankangle versus in-cylinder pressure characteristic curve (indicated by the broken line) obtained without any crankshaft reverse-rotation-and-normal-rotation control.

As soon as the angular position of crankshaft 02 reaches crankangle CR1 (within intake-valve open crankangle range X) shown in FIG. 6, switching from the reverse-rotational state of crankshaft 02 to the normal-rotational state occurs (see step S9 of FIG. 8). Crankshaft 02 begins to moderately rotate in the normal-rotational direction. At this time, the internal space of the engine cylinder is opened or exposed to the atmosphere via each of intake valves 4, 4 slightly opened and thus the in-cylinder pressure becomes a pressure level substantially identical to atmospheric pressure value (b). When crankshaft 02 further rotates in the normal-rotational direction, the in-cylinder pressure becomes a negative pressure value (c) slightly less than atmospheric pressure value (b).

Thereafter, when crankshaft 02 continues to rotate in the normal-rotational direction and then the angular position of crankshaft 02 reaches intake valve closure timing IC1, each of intake valves 4, 4 closes. The in-cylinder pressure tends to fall, as crankshaft 02 further rotates toward the B.D.C. position of piston 01. When the angular position of crankshaft 02 reaches the B.D.C. position, the in-cylinder pressure becomes a peak negative pressure value (approximately, 0.5 atmosphere).

Subsequently to the above, when crankshaft 02 further rotates in the normal-rotational direction, an upward stroke of piston 01 occurs and thus the in-cylinder pressure begins to rise by a compressive force (compression pressure) of piston 01. After this, when crankshaft 02 further rotates in the normal-rotational direction and the angular position of crankshaft 02 reaches a hypothetical crankangle position IC1' of crankshaft 02 symmetrical to the crankangle position corresponding to intake valve closure timing IC1, with respect to the B.D.C. position, the in-cylinder pressure rises and recovers to a pressure level substantially equal to atmospheric pressure value (b). The angular position of crankshaft 02 is approaching close to the T.D.C. position, when piston 01 passes near the hypothetical crankangle position IC1'. Therefore, even when crankshaft 02 further rotates and then the angular position of crankshaft 02 reaches the T.D.C. position, the in-cylinder pressure at the T.D.C. position does not become so high. Actually, the in-cylinder pressure at the T.D.C. position becomes a pressure level substantially identical to 2 atmosphere (d). As explained above, it is possible to adequately suppress an excessive in-cylinder pressure rise.

As set forth above, by virtue of the decompressing action based on crankshaft reverse-rotation-and-normal-rotation control executed by ECU 22 incorporated in the engine start control apparatus of the embodiment, it is possible to effectively satisfactorily suppress noise and vibrations from occurring owing to compression during the engine start-up period.

Furthermore, the angle of reverse rotation of crankshaft 02 is approximately 150 degrees of crankangle. Thus, there is a less electrical load on a battery or on a reversible starter motor during crankshaft reverse-rotation control.

In the crankshaft reverse-rotation-and-normal-rotation control routine of FIG. 8, the desired crankshaft reverse-rotation angle required for crankshaft reverse-rotation control is computed as a summed value $\alpha$, which is obtained by adding the predetermined slight margin $\Delta$ to the reverse-rotation angle of crankshaft 02 from the current crankangle CR0 read through step S2 to the crankangle corresponding to intake valve closure timing IC1 estimated through step S4. In lieu thereof, the desired crankshaft reverse-rotation angle may be preset to a fixed value $\beta$ (greater than the summed value $\alpha$). For instance, a summed value, obtained by adding the predetermined slight margin $\Delta$ to a constant reverse-rotation angle of crankshaft 02 from 40° crankangle (40 degrees of crankshaft rotation) after the B.D.C. position to the crankangle corresponding to intake valve closure timing IC1 estimated through step S4, may be preset as the fixed value $\beta$. In this case, even if the current crankangle CR0 is a position of what of the specified crankangle range from 40° crankangle before the B.D.C. position to 40° crankangle after the B.D.C. position, it is possible to reverse-rotate crankshaft 02 until the angular position of crankshaft 02 certainly exceeds the crankangle corresponding to intake valve closure timing IC1 and intake valve 4 becomes shifted from the valve closed state to the valve open state. Presetting the desired crankshaft reverse-rotation angle to the fixed value $\beta$ eliminates the necessity of complicated arithmetic and logic operations executed within ECU 22, and contributes to the reduced memory capacities, and lowers the data quantities to be processed, thus reducing manufacturing costs.

Referring now to FIG. 10, there is shown the modified crankshaft reverse-rotation-and-normal-rotation control routine. The modified control routine shown in FIG. 10 is also executed as time-triggered interrupt routines to be triggered every predetermined time intervals such as 10 milliseconds. The modified control routine of FIG. 10 is different from the control routine of FIG. 8, in that a current crankangle CR0 of crankshaft 02 and intake valve closure timing IC1, estimated based on the latest up-to-date informational signals from drive-shaft angular position sensor 28 and controlshaft angular position sensor 29, are both derived or read just after the ignition key has been turned ON for engine startup.

At step S11, a check is made to determine whether the ignition key has been turned ON for engine startup. When the answer to step S11 is negative (NO), that is, the ignition key has not yet been turned ON for engine startup, one execution cycle of the routine terminates. When the answer to step S11 is affirmative (YES), that is, the ignition key has already been turned ON for engine startup, the routine proceeds from step S11 to step S12.

At step S12, a current crankangle CR0 of crankshaft 02, detected by crank angle sensor 27 just after the ignition key has been turned ON for engine startup, is read. The current crankangle CR0 is temporarily memorized in a predetermined memory address. In other words, crankangle CR0 of crankshaft 02 is detected by crank angle sensor 27 immediately when the engine is started up or restarted.

At step S13, the processor of ECU 22 detects or determines or discriminates, based on the latest up-to-date informational signal from drive-shaft angular position sensor 28, which of engine cylinders is in an intake stroke or in a compression stroke.

At step S14, a check is made to determine whether a current piston-stroke position of an engine cylinder whose piston stroke is in the intake stroke or in the compression stroke, in other words, the current crankangle CR0 of crankshaft 02, read through step S12, is within a specified crankangle range from 40° crankangle (40 degrees of crankshaft rotation) before the B.D.C. position to 40° crankangle after the B.D.C. position. When the answer to step S14 is negative (NO), that is, the current crankangle CR0 of crankshaft 02 is out of the specified crankangle range from 40° crankangle BBDC to 40° crankangle ABDC, the processor of ECU 22 determines that the compression pressure at the T.D.C. position of piston 01 does not become so high. Thus, the routine jumps from step S14 to step S18, without initiating crankshaft reverse-rotation control. Conversely when the answer to step S14 is affirmative (YES), that is, the current crankangle CR0 of crankshaft 02 is within the specified crankangle range from 40° crankangle BBDC to 40° crankangle ABDC (i.e., in case of (40° CA BBDC) $\leq$ CR0 $\leq$ (40° CA ABDC)), the processor of ECU 22 determines that there is an increased tendency for the compression pressure at the T.D.C. position to become so high. Thus, the routine proceeds from step S14 to step S15.

At step S15, the intake valve closure timing IC1 of intake valve 4, estimated or calculated based on the latest up-to-date informational signals from drive-shaft angular position sensor 28 and control-shaft angular position sensor 29, is read. The intake valve closure timing IC1 is memorized in a predetermined memory address.

At step S16 of FIG. 10, in the same manner as step S7 of FIG. 8, ECU 22 executes crankshaft reverse-rotation control by outputting a control current to reversible starter motor 07 and by temporarily rotating crankshaft 02 in the reverse-rotational direction. In the modified control routine of FIG. 10, the desired crankshaft reverse-rotation angle for crankshaft reverse-rotation control is set to the summed value α, obtained by adding the predetermined slight margin Δ to a reverse-rotation angle of crankshaft 02 from the current crankangle CR0 read through step S12 to the crankangle corresponding to intake valve closure timing IC1 estimated through step S15. Alternatively, the desired crankshaft reverse-rotation angle may be preset to the fixed value β (greater than the summed value α), which fixed value is obtained by adding the predetermined slight margin Δ to a constant reverse-rotation angle of crankshaft 02 from 40° crankangle (40 degrees of crankshaft rotation) after the B.D.C. position to the crankangle corresponding to intake valve closure timing IC1 estimated through step S15.

At step S17 of FIG. 10, in the same manner as step S8 of FIG. 8, a check is made to determine whether the amount of reverse rotation of crankshaft 02, created during crankshaft reverse-rotation control, exceeds intake valve closure timing IC1 estimated through step S15, and thus the angular position of crankshaft 02, rotated in the reverse-rotational direction, is within an intake-valve open crankangle range X corresponding to an intake-valve open period defined between intake valve closure timing IC1 and intake valve open timing IO1 just before intake valve closure timing IC1. Concretely, such a check is achieved by determining whether the crankshaft reverse-rotation angle exceeds the summed value α. When the answer to step S17 is negative (NO), the routine returns from step S17 to step S16. Conversely when the answer to step S17 is affirmative (YES), the routine proceeds from step S17 to step S18.

At step S18 of FIG. 10, in the same manner as step S9 of FIG. 8, ECU 22 initiates crankshaft normal-rotation control by rotating crankshaft 02 in the normal-rotational direction by means of reversible starter motor 07.

At step S19, a check is made to determine whether the amount of normal rotation of crankshaft 02, created during crankshaft normal-rotation control, reaches a predetermined amount of normal rotation. When the answer to step S19 is negative (NO), that is, the predetermined amount of normal rotation has not yet been reached, the routine returns from step S19 to step S18. Conversely when the answer to step S19 is affirmative (YES), that is, the predetermined amount of normal rotation has been reached, the routine proceeds from step S19 to step S20. Herein, the amount of normal rotation of crankshaft 02, created during crankshaft normal-rotation control, exceeding the predetermined amount of normal rotation, in other words, an adequate crankshaft normal-rotational speed rise, means that the engine has been started up.

At step S20, ECU 22 initiates intake-valve working angle D enlargement control (or intake-valve working angle scale-up-control), and simultaneously initiates intake-valve closure timing phase-retard control. Actually, ECU 22 outputs and applies a control current to motor 20 of intake-valve VEL mechanism 1 for executing the intake-valve working angle D enlargement control, and simultaneously outputs a control current to the electromagnetic coil of the hysteresis brake of intake-valve VTC mechanism 2 for phase-retarding the angular phase of drive shaft 6 (the driven member) relative to timing pulley 30 (the drive ring). At this point of time, the engine is running satisfactorily, and thus moving valve-operating parts are in a dynamic-friction state in which a coefficient of friction of each of the moving valve-operating parts is comparatively low. Therefore, under these conditions, it is possible to smoothly reliably execute continuously variable valve event and lift control (e.g., the intake-valve working angle D enlargement control) and variable phase control (e.g., the intake-valve phase retard control) by means of intake-valve VEL and VTC mechanisms 1 and 2.

At step S21, ECU 22 initiates electronic spark control according to which the electronic ignition system furnishes high-voltage sparks to ignite the compressed air/fuel mixture in combustion chamber 04.

According to the modified control routine of FIG. 10, it is possible to effectively phase-retard the intake valve closure timing of intake valve 4 to a timing value substantially corresponding to the B.D.C. position of piston 01, by simultaneously executing both of intake-valve working angle D enlargement control and intake-valve closure timing phase-retard control (see step S20 of FIG. 10). Phase-retarding the intake valve closure timing to a timing value substantially corresponding to the B.D.C. position ensures an adequate intake-air quantity, and also contributes to the enhanced effective compression ratio on compression stroke. Therefore, during the electronic spark control initiated through step S21 subsequently to step S20, the compressed air/fuel mixture in combustion chamber 04 can be smoothly effectively ignited, thus insuring complete explosion in combustion chamber 04. This enhances or improves the engine startability/restartability.

According to the modified control routine of FIG. 10, the intake-valve open period of intake valve 4, defined between the intake valve closure timing and the intake valve open timing at the initial stage (before engine cranking) of the engine start-up period, is set to the intake-valve open crankangle range X (see a relatively narrow working-angle range X shown in FIG. 6) corresponding to the intake-valve open period defined between intake valve closure timing IC1 and intake valve open timing IO1. On the other hand, the intake-valve open period of intake valve 4, defined between the intake valve closure timing and the intake valve open timing at the last stage (after adequate crankshaft normal-rotational speed rise) of the engine start-up period, is set to an intake-valve open crankangle range Z, somewhat widely compensated for by the intake-valve working angle D enlargement control executed through step S20, (see a relatively wide working-angle range Z shown in FIG. 6).

In a normal engine operating state, such as during middle and high engine load operation, responsively to a required engine power output, the intake-valve open period (the intake-valve lifted period), defined between the intake valve closure timing and the intake valve open timing, is generally set to a wide intake-valve open crankangle range Q, enlarged by phase-advancing the intake valve open timing and by phase-retarding the intake valve closure timing by means of both of intake-valve VEL and VTC mechanisms 1 and 2.

On the contrary, in a light engine load range (or at part load operation), the intake valve open timing and the intake valve open period (the intake-valve working angle) are controlled or adjusted to a characteristic almost similar to the intake-valve open crankangle range X shown in FIG. 6 by means of intake-valve VEL and VTC mechanisms 1 and 2. Thus, during light load operation, it is possible to effectively reduce the pumping loss and thus to ensuring improved fuel economy (in other words, reduced fuel consumption rate). Suppose that the engine has been stopped under such a control state (during light load operation). In such a case, at the last stage (after adequate crankshaft normal-rotational speed rise) of the engine start-up period, there is a less need to operate intake-valve VEL and VTC mechanisms 1 and 2 for intake-valve working angle D enlargement control and intake-valve closure timing phase-retard control, thus simplifying control procedures.

Referring now to FIG. 11, there is shown the engine starting/restarting time shortening routine. It is preferable that the processor of ECU 22 executes such an engine starting/restarting time shortening routine shown in FIG. 11 before determining whether the ignition key has been turned ON for engine startup through step S11, in other words, after the engine has been stopped. The engine starting/restarting time shortening routine shown in FIG. 11 is also executed as time-triggered interrupt routines to be triggered every predetermined time intervals such as 10 milliseconds. As a modification, the engine starting/restarting time shortening routine shown in FIG. 11 may be added before step S11 of the modified control routine shown in FIG. 10.

At step S31, a check is made to determine whether a necessary condition (containing at least a shift of the ignition key to a switched-OFF state), required to stop the engine, is satisfied. When the answer to step S31 is negative (NO), that is, the necessary condition (containing at least the ignition key switched-OFF state), required to stop the engine, is unsatisfied, the routine returns again to step S31. Conversely when the answer to step S31 is affirmative (YES), that is, the necessary condition, required to stop the engine, is satisfied, the routine advances from step S31 to step S32.

At step S32, the intake-valve working angle D of each of intake valves 4, 4 is controlled or adjusted or brought closer to a minimum working angle (e.g., a small working angle D1) in advance by means of intake-valve VEL mechanism 1, and simultaneously the intake valve closure timing of each of intake valves 4, 4 is controlled or adjusted or brought closer to a maximum phase-advanced timing value in advance by means of intake-valve VTC mechanism 2.

At step S33, a check is made to determine, based on the latest up-to-date informational signals from drive-shaft angular position sensor 28 and control-shaft angular position sensor 29, whether the desired value for continuously variable valve event and lift control executed by intake-valve VEL mechanism 1 and the desired value for variable phase control executed by intake-valve VTC mechanism 2 have been attained. When the answer to step S33 is negative (NO), that is, the desired value for continuously variable valve event and lift control and the desired value for variable phase control have not yet been reached or attained, the routine returns from step S33 to step S32. Conversely when the answer to step S33 is affirmative (YES), that is, the desired value for continuously variable valve event and lift control and the desired value for variable phase control have already been reached or attained, the routine proceeds from step S33 to step S34.

At step S34, engine stop control is executed to completely stop the engine. Thereafter, the routine proceeds from step S34 of FIG. 11 to step S11 of FIG. 10.

In case of the combined control program of the modified routine of FIG. 10 and the engine starting/restarting time shortening routine of FIG. 11, as previously discussed, by the favor of the engine starting/restarting time shortening routine shown in FIG. 11, in particular, step S32, it is possible to effectively reduce the compression pressure at the T.D.C. position on compression stroke during engine cranking for engine starting (or engine restarting) by controlling the intake-valve working angle D to the minimum working angle (small working angle D1) by means of intake-valve VEL mechanism 1, and simultaneously by controlling the intake valve closure timing to the maximum phase-advanced timing value by means of intake-valve VTC mechanism 2. Additionally, by way of the crankshaft reverse-rotation control of FIG. 10, executed subsequently to step S34 of FIG. 11, it is possible to effectively suppress or reduce noise and vibrations during the engine start-up period for engine starting or engine restarting.

As a modification of step S32 of FIG. 11, the intake-valve working angle D of each of intake valves 4, 4 may be controlled or adjusted to a predetermined small working angle slightly greater than the minimum working angle (small working angle D1) by means of intake-valve VEL mechanism 1, and simultaneously the intake valve closure timing of each of intake valves 4, 4 may be controlled or adjusted to a predetermined timing value slightly phase-retarded from the maximum phase-advanced timing value by means of intake-valve VTC mechanism 2. According to such a modification of step S32, it is possible to somewhat reduce the amount of reverse rotation of crankshaft 02 during crankshaft reverse-rotation control, thereby effectively shortening a time duration required for reverse rotation of crankshaft 02. This contributes to the reduced electrical load on a car battery (an electric power source).

As described previously, at step S6 of the crankshaft reverse-rotation-and-normal-rotation control routine of FIG. 8, a current piston-stroke position of an engine cylinder whose piston stroke is in an intake stroke or in a compression stroke, that is, a current crankangle CR0 of crankshaft 02 is within a specified crankangle range of BDC ±40°. In the shown embodiment, the specified crankangle range is set to BDC ±40°. This is because there is an increased tendency for the rotation angle of crankshaft 02, obtained in the engine stopped state, to become 40° or more crankangle after the B.D.C. position. In more detail, when piston 01 nears the T.D.C. position, the in-cylinder pressure becomes high, and thus piston 01, upwardly moving, tends to be put back by the high in-cylinder pressure. As a result of this, there is an increased tendency for piston 01 (or the engine crankshaft) to be stopped within a crankangle range of 40° or more crankangle after the B.D.C. position. In order to reduce the number of executions of crankshaft reverse-rotation control, the specified crankangle range is set to BDC ±40° except the crankangle range of 40° or more crankangle after the B.D.C. position. Furthermore, within the crankangle range of 40° or more crankangle after the B.D.C. position, there is a tendency for the in-cylinder pressure at the T.D.C. position to become comparatively low, and therefore there is a less necessity for crankshaft reverse-rotation control. Moreover, on general multiple-cylinder engines having four to eight cylinders, the engine cylinder whose piston is within the specified crankangle range of BDC ±40° (that is, an 80° crankangle range) is limited to only one cylinder. On four-cylinder engines, the crankangle difference between engine cylinders is 720°/4=180°, which is wider than the 80° crankangle range. On eight-cylinder engines, the crankangle difference between engine cylinders is 720°/8=90°, which is wider than the 80° crankangle range. Therefore, there is only one engine cylinder whose piston is within the specified crankangle range of BDC ±40° (80° crankangle range), on general multiple-cylinder engines having four to eight cylinders. Setting of the specified crankangle range to BDC ±40°, contributes to the more simplified control procedures.

Also, at step S2 of the crankshaft reverse-rotation-and-normal-rotation control routine of FIG. 8, a current crankangle CR0 of crankshaft 02 is detected by crank angle sensor 27 just after the engine has been stopped, and the current crankangle CR0 is memorized in a predetermined memory address. By utilizing the memorized current crankangle CR0, it is possible to accurately determine beforehand whether crankshaft 02 should be reverse-rotated or normal-rotated when starting/restarting the engine. This contributes to the enhanced responsiveness to engine starting/restarting.

At step S12 of the modified crankshaft reverse-rotation-and-normal-rotation control routine of FIG. 10, the control system is constructed to detect and read a current crankangle CR0 of crankshaft 02 by means of crank angle sensor 27 just after the ignition key has been turned ON for engine startup (or for engine restarting). Even when the crankangle of crankshaft 02 slightly changes or displaces after the engine has been stopped, it is possible to accurately detect the current crankangle CR0 of crankshaft 02 based on the latest up-to-date informational signal from crank angle sensor 27, just before crankshaft reverse-rotation control. This eliminates the necessity to store input informational signal data from crank angle sensor 27 during a time interval from a point of time when the engine has been stopped to a point of time when the ignition key is turned ON for engine startup (or for engine restarting). This contributes to the reduced memory capacities of the memory (RAM) of ECU 22.

When initiating the crankshaft normal-rotation control by rotating crankshaft 02 in the normal-rotational direction at step S9 of the crankshaft reverse-rotation-and-normal-rotation control routine of FIG. 8, torque, applied to the motor shaft of starter motor 07 and acting on crankshaft 02 in the reverse-rotational direction of crankshaft 02, is reduced or decreasingly compensated for by way of starter motor torque control, just before switching to the normal-rotational state. Thus, in a transient state where the rotation of crankshaft 02 is reversed from the reverse-rotational direction to the normal-rotational direction, it is possible to prevent an excessive change in rotational direction of crankshaft 02, in other words, a rapid change in crankshaft angular acceleration, thus avoiding rotary motion of crankshaft 02 from being greatly affected by the inertial force, and consequently suppressing undesirable shock, noise and vibrations during the transient state.

In the additional routine of FIG. 11, in particular, at step S32, just before completely stopping the engine, the intake valve closure timing of intake valve 4 is controlled or adjusted to a predetermined timing value before the T.D.C. position of piston 01, by means of intake-valve VEL and VTC mechanisms 1 and 2. Therefore, the processor of ECU 22 can determine the intake valve closure timing of intake valve 4 in the engine stopped state or at the point of time when the ignition key has been turned ON for engine startup, is preset to the predetermined timing value. Thus, it is possible to easily accurately determine the desired crankshaft reverse-rotation angle and the a time duration required for reverse rotation of crankshaft 02, in other words, the execution time of crankshaft reverse-rotation control.

As a further modification, the intake-valve VTC mechanism may be structurally designed or constructed such that the VTC mechanism is held at its maximum phase-retard position (an initial angular-phase position) in the engine stopped state. As a still further modification, intake-valve VTC mechanism 2 itself may be eliminated or omitted. In these modifications, it is possible to easily detect or estimate intake valve closure timing IC1 of intake valve 4 based on only the rotation angle of control shaft 17, detected or sensed by control-shaft angular position sensor 29 that detects intake valve open timing IO1.

In the shown embodiment, in determining whether a current piston-stroke position of an engine cylinder whose piston stroke is in the intake stroke or in the compression stroke, is within a specified crankangle range from 40 degrees of crankangle before the piston B.D.C. position to 40 degrees of crankangle after the piston B.D.C. position, in other words, the current crankangle CR0 of crankshaft 02, a crankangle CR detected by crank angle sensor 27 is used. Instead of using the detected crankangle CR, an engine cylinder whose piston stroke is in the intake stroke or in the compression stroke, and whose current piston-stroke position is within the specified crankangle range of BDC ±40° may be estimated or detected by means of an in-cylinder pressure sensor or an in-cylinder pressure detector. In this case, for easy restarting by effective decompressing action, the processor of ECU 22 may be programmed to perform the following functions. That is, ECU 22 reverse-rotates crankshaft 02 in a reverse-rotational direction by way of crankshaft reverse-rotation control until intake valve 4 becomes shifted from its valve closed state to its valve open state, when cranking the engine for engine startup under a specific condition where the in-cylinder pressure, created in an engine cylinder when a predetermined time duration has expired from a time when the engine has been stopped, reaches a predetermined negative pressure value, and the piston-stroke position of the engine cylinder is in the intake stroke or in the compression stroke. Thereafter, ECU 22 rotates crankshaft 02 in a normal-rotational direction by way of crankshaft normal-rotation control after intake valve 4 has been shifted to the valve open state.

The entire contents of Japanese Patent Application No. 2004-302345 (filed Oct. 18, 2004) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An engine start control apparatus comprising:
 a crank angle sensor adapted to detect a crankangle of a crankshaft of an engine;
 a stroke discrimination device that discriminates which of engine cylinders is in either one of intake and compression strokes or in either one of expansion and exhaust strokes; and
 a controller configured to be electronically connected to at least the crank angle sensor and the stroke discrimination device for controlling rotary motion of the crankshaft during an engine start-up period; the controller comprising a processor programmed to perform the following,
 (a) setting a closure timing of an intake valve to a preset timing value before a piston bottom dead center (B.D.C.) position as preparation for engine startup;
 (b) temporarily rotating the crankshaft in a reverse-rotational direction by way of crankshaft reverse-rotation control until the intake valve becomes shifted from a valve closed state to a valve open state, when cranking the engine for startup under a specific condition where a crankangle of an engine cylinder whose piston stroke is in the intake stroke or in the compression stroke, is within a crankangle range substantially corresponding to the piston B.D.C. position; and (c) rotating the crankshaft in a normal-rotational direction by way of crankshaft normal-rotation control after the intake valve has been shifted to the valve open state.

2. The engine start control apparatus as claimed in claim 1, wherein:
a desired reverse-rotation angle required for the crankshaft reverse-rotation control is preset to a fixed value.

3. The engine start control apparatus as claimed in claim 1, wherein said processor is further programmed for:
calculating, based on the crankangle detected by the crank angle sensor, a second crankangle that the intake valve begins to open by way of reverse rotation of the crankshaft;
calculating a desired reverse-rotation angle required for the crankshaft reverse-rotation control based on the second crankangle; and
executing the crankshaft reverse-rotation control based on the desired reverse-rotation angle.

4. The engine start control apparatus as claimed in claim 1, wherein:
the crankangle range substantially corresponding to the piston B.D.C. position is a specified crankangle range from 40 degrees of crankangle before the piston B.D.C. position to 40 degrees of crankangle after the piston B.D.C. position.

5. The engine start control apparatus as claimed in claim 4, wherein:
the crank angle sensor detects the crankangle of the crankshaft in an engine stopped state; and
the controller memorizes information about the crankangle detected by the crank angle sensor.

6. The engine start control apparatus as claimed in claim 1, wherein:
the crank angle sensor detects the crankangle of the crankshaft immediately when restarting the engine.

7. The engine start control apparatus as claimed in claim 1, further comprising:
a drive-shaft position sensor that detects a rotation angle of a drive shaft, which is mechanically linked to the intake valve for operating the intake valve,
wherein the stroke discrimination device discriminates a piston stroke of each of the engine cylinders based on the drive-shaft rotation angle detected by the drive-shaft position sensor.

8. The engine start control apparatus as claimed in claim 7, wherein:
the drive-shaft position sensor detects the drive-shaft rotation angle in an engine stopped state; and
the controller memorizes information about the drive-shaft rotation angle detected by the drive-shaft position sensor.

9. The engine start control apparatus as claimed in claim 1, wherein said processor is further programmed for:
decreasingly compensating for a torque, by which the crankshaft is rotated in the reverse-rotational direction, in a transient state before switching from the crankshaft reverse-rotation control to the crankshaft normal-rotation control.

10. The engine start control apparatus as claimed in claim 3, further comprising:
a variable valve operating device capable of variably adjusting an open-and-closure timing of the intake valve in a normal engine operating state,
wherein the controller controls the intake valve closure timing to the preset timing value before the piston B.D.C. position in advance by means of the variable valve operating device during a time period that the engine is still running before the engine has been completely stopped or before the engine is cranked for engine restarting.

11. The engine start control apparatus as claimed in claim 3, further comprising:
a variable valve operating device capable of variably adjusting an open-and-closure timing of the intake valve in a normal engine operating state,
wherein the controller controls the intake valve closure timing to a predetermined timing value phase-retarded from a maximum phase-advanced timing value in advance by means of the variable valve operating device during a time period that the engine is still running before the engine has been completely stopped or before the engine is cranked for engine restarting.

12. The engine start control apparatus as claimed in claim 3, further comprising:
a variable valve operating device capable of variably adjusting an open-and-closure timing of the intake valve in a normal engine operating state,
wherein the controller controls the intake valve closure timing to a maximum phase-advanced timing value in advance by means of the variable valve operating device during a time period that the engine is still running before the engine has been completely stopped or before the engine is cranked for engine restarting.

13. The engine start control apparatus as claimed in claim 12, further comprising:
a variable valve operating device capable of variably adjusting an open-and-closure timing of the intake valve in a normal engine operating state;
the variable valve operating device comprising:
(i) a first variable valve operating mechanism capable of variably adjusting a valve lift and working angle characteristic by varying a rotation angle of a control shaft of an attitude control mechanism that changes a fulcrum of oscillating motion of a motion converter, which is mechanically linked to the intake valve for operating the intake valve; and
(ii) a second variable valve operating mechanism capable of varying an angular phase of a drive shaft, which is mechanically linked to the intake valve for operating the intake valve,
wherein, when a necessary condition required to stop the engine is satisfied, a working angle of the intake valve is adjusted to a minimum working angle by means of the first variable valve operating mechanism and simultaneously the intake valve closure timing is adjusted to a maximum phase-advanced timing value by means of the second valve operating mechanism.

14. The engine start control apparatus as claimed in claim 3, further comprising:
a variable valve operating device capable of variably adjusting an open-and-closure timing of the intake valve in a normal engine operating state, the variable valve operating device comprising a continuously variable intake valve event and lift control mechanism capable of variably adjusting a valve lift and working angle characteristic by varying a rotation angle of a control shaft of an attitude control mechanism that changes a fulcrum of oscillating motion of a motion converter, which is mechanically linked to the intake valve for operating the intake valve, wherein said processor is further programmed for:

estimating the intake valve closure timing by detecting the rotation angle of the control shaft.

15. The engine start control apparatus as claimed in claim 3, further comprising:

a variable valve operating device capable of variably adjusting an open-and-closure timing of the intake valve in a normal engine operating state;

the variable valve operating device comprising:

(i) a first variable valve operating mechanism capable of variably adjusting a valve lift and working angle characteristic by varying a rotation angle of a control shaft of an attitude control mechanism that changes a fulcrum of oscillating motion of a motion converter, which is mechanically linked to the intake valve for operating the intake valve; and (ii) a second variable valve operating mechanism capable of varying an angular phase of a rotation angle of a drive shaft, which is mechanically linked to the intake valve for operating the intake valve, wherein said processor is further programmed for:

estimating the intake valve closure timing by detecting both of the rotation angle of the control shaft and the rotation angle of the drive shaft.

16. The engine start control apparatus as claimed in claim 3, further comprising:

a variable valve operating device capable of variably adjusting an open-and-closure timing of the intake valve in a normal engine operating state, the variable valve operating device comprising a continuously variable intake valve event and lift control (VEL) mechanism capable of variably adjusting a valve lift and working angle characteristic; and the VEL mechanism comprising:

(a) a drive shaft rotated in synchronism with rotation of the crankshaft and having a drive cam integrally connected onto an outer periphery of the drive shaft;

(b) a rockable cam oscillatingly supported on the outer periphery of the drive shaft and adapted to be in sliding-contact with an upper contact surface of a valve lifter for opening and closing the intake valve;

(c) a motion converter that mechanically linking the drive cam to the rockable cam; and (d) an attitude control mechanism comprising a control shaft and a control cam whose geometric center is displaced a predetermined distance from an axis of the control shaft for changing a fulcrum of oscillating motion of the motion converter by rotary motion of the control shaft depending on an engine-and-vehicle operating condition.

17. The engine start control apparatus as claimed in claim 3, wherein said processor is further programmed for:

phase-retarding the intake valve closure timing to a timing value substantially corresponding to the piston B.D.C. position on the intake stroke after switching from the crankshaft reverse-rotation control to the crankshaft normal-rotation control.

18. The engine start control apparatus as claimed in claim 17, further comprising:

a variable valve operating device capable of variably adjusting an open-and-closure timing of the intake valve in a normal engine operating state;

the variable valve operating device comprising:

(i) a first variable valve operating mechanism capable of variably adjusting a valve lift and working angle characteristic by varying a rotation angle of a control shaft of an attitude control mechanism that changes a fulcrum of oscillating motion of a motion converter, which is mechanically linked to the intake valve for operating the intake valve; and (ii) a second variable valve operating mechanism capable of varying an angular phase of a rotation angle of a drive shaft, which is mechanically linked to the intake valve for operating the intake valve, wherein said processor is further programmed for:

phase-retarding the intake valve closure timing to the timing value substantially corresponding to the piston B.D.C. position by way of intake-valve working angle enlargement control performed by the first variable valve operating mechanism and intake-valve closure timing phase-retard control performed by the second variable valve operating mechanism.

* * * * *